US011768305B2

(12) United States Patent
Thompson et al.

(10) Patent No.: US 11,768,305 B2
(45) Date of Patent: Sep. 26, 2023

(54) SPECTRAL ANALYSIS, MACHINE LEARNING, AND FRAC SCORE ASSIGNMENT TO ACOUSTIC SIGNATURES OF FRACKING EVENTS

(71) Applicant: Origin Rose LLC, Boulder, CO (US)

(72) Inventors: Reid Daniel Thompson, Edmond, OK (US); Jeffrey Neal Rose, Boulder, CO (US); Jonathan Swanson Rose, Boulder, CO (US)

(73) Assignee: Origin Rose LLC, Boulder, CO (US)

( * ) Notice: Subject to any disclaimer, the term of this patent is extended or adjusted under 35 U.S.C. 154(b) by 0 days.

(21) Appl. No.: 17/292,768

(22) PCT Filed: Dec. 10, 2020

(86) PCT No.: PCT/US2020/064294
§ 371 (c)(1),
(2) Date: May 11, 2021

(87) PCT Pub. No.: WO2021/119300
PCT Pub. Date: Jun. 17, 2021

(65) Prior Publication Data
US 2022/0381934 A1    Dec. 1, 2022

Related U.S. Application Data

(60) Provisional application No. 63/058,534, filed on Jul. 30, 2020, provisional application No. 63/058,548, (Continued)

(51) Int. Cl.
*G01V 1/42* (2006.01)
*G01V 1/30* (2006.01)
(Continued)

(52) U.S. Cl.
CPC ............... *G01V 1/42* (2013.01); *E21B 41/00* (2013.01); *E21B 43/26* (2013.01); *E21B 47/095* (2020.05);
(Continued)

(58) Field of Classification Search
CPC ........ E21B 47/06; E21B 47/107; E21B 43/26; E21B 2200/22; E21B 43/2607; E21B 49/00; E21B 47/095; E21B 47/14
See application file for complete search history.

(56) References Cited

U.S. PATENT DOCUMENTS 4,665,511 A    5/1987    Rodney et al.
4,757,873 A    7/1988    Linyaev et al.
(Continued)

FOREIGN PATENT DOCUMENTS

EP    2327857 B1    3/2014
EP    2746527 B1    10/2020
(Continued)

OTHER PUBLICATIONS

Sun Hwa Lee, "International Preliminary Report on Patentability Regarding International Patent Application No. PCT/US2020/064294", dated Jun. 23, 2022, p. 11, Published in: CH.
(Continued)

*Primary Examiner* — Zakiya W Bates
(74) *Attorney, Agent, or Firm* — Neugeboren O'Dowd PC

(57) ABSTRACT

System, method, and apparatus for classifying fracture quantity and quality of fracturing operation activities during hydraulic fracturing operations, the system comprising: a sensor coupled to a fracking wellhead, circulating fluid line, or standpipe of a well and configured to convert acoustic vibrations in fracking fluid in the fracking wellhead into an electrical signal; a memory configured to store the electrical signal; a converter configured to access the electrical signal
(Continued)

from the memory and convert the electrical signal in a window of time into a current frequency domain spectrum; a machine-learning system configured to classify the current frequency domain spectrum, the machine-learning system having been trained on previous frequency domain spectra measured during previous hydraulic fracturing operations and previously classified by the machine-learning system; and a user interface configured to return a classification of the current frequency domain spectrum to an operator of the fracking wellhead.

45 Claims, 20 Drawing Sheets

Related U.S. Application Data filed on Jul. 30, 2020, provisional application No. 62/945,949, filed on Dec. 10, 2019, provisional application No. 62/945,953, filed on Dec. 10, 2019, provisional application No. 62/945,929, filed on Dec. 10, 2019, provisional application No. 62/945,957, filed on Dec. 10, 2019.

(51) Int. Cl.
| E21B 41/00 | (2006.01) |
| E21B 43/26 | (2006.01) |
| G01V 1/50 | (2006.01) |
| E21B 47/095 | (2012.01) |
| E21B 49/00 | (2006.01) |
| E21B 47/06 | (2012.01) |

(52) U.S. Cl.
CPC .............. *E21B 49/00* (2013.01); *G01V 1/301* (2013.01); *G01V 1/50* (2013.01); *E21B 47/06* (2013.01); *E21B 2200/22* (2020.05); *G01V 2210/646* (2013.01)

(56) References Cited

U.S. PATENT DOCUMENTS

| 5,031,155 | A | 7/1991 | Hsu |
| 5,130,950 | A | 7/1992 | Orban et al. |
| 5,214,251 | A | 5/1993 | Orban et al. |
| 5,235,984 | A | 8/1993 | D'Sa |
| 5,341,345 | A | 8/1994 | Warner et al. |
| 5,459,697 | A | 10/1995 | Chin et al. |
| 5,515,336 | A | 5/1996 | Chin et al. |
| 5,753,812 | A | 5/1998 | Aron et al. |
| 5,995,447 | A | 11/1999 | Mandal et al. |
| 6,002,639 | A | 12/1999 | Birchak et al. |
| 6,088,294 | A | 7/2000 | Leggett, III et al. |
| 6,213,250 | B1 | 4/2001 | Wisniewski et al. |
| 6,366,531 | B1 | 4/2002 | Varsamis et al. |
| 6,564,899 | B1 | 5/2003 | Arian et al. |
| 6,672,163 | B2 | 1/2004 | Han et al. |
| 6,995,500 | B2 | 2/2006 | Yogeswaren |
| 7,036,363 | B2 | 5/2006 | Yogeswaren |
| 7,075,215 | B2 | 7/2006 | Yogeswaren |
| 7,339,494 | B2 | 3/2008 | Shah et al. |
| 7,460,435 | B2 | 12/2008 | Garcia-Osuna et al. |
| 7,513,147 | B2 | 4/2009 | Yogeswaren |
| 7,587,936 | B2 | 9/2009 | Han |
| 7,999,695 | B2 | 8/2011 | Rodney et al. |
| 8,162,050 | B2 | 4/2012 | Roddy |
| 8,818,779 | B2 | 8/2014 | Sadlier et al. |
| 8,898,044 | B2 | 11/2014 | Craig |
| 9,194,967 | B2 | 11/2015 | Lacazette |
| 9,557,434 | B2 | 1/2017 | Keller et al. |
| 9,567,819 | B2 | 2/2017 | Cavender et al. |
| 9,988,900 | B2 | 6/2018 | Kampfer et al. |
| 10,030,497 | B2 | 7/2018 | Dawson et al. |
| 10,385,670 | B2 | 8/2019 | James et al. |
| 10,415,376 | B2 | 9/2019 | Song et al. |
| 10,458,233 | B2 | 10/2019 | Xia |
| 10,465,505 | B2 | 11/2019 | Disko et al. |
| 10,480,308 | B2 | 11/2019 | Morrow et al. |
| 10,781,690 | B2 | 9/2020 | Malik et al. |
| 2010/0118657 | A1 | 5/2010 | Trinh et al. |
| 2012/0111559 | A1 | 5/2012 | Deady et al. |
| 2012/0111560 | A1 | 5/2012 | Hill et al. |
| 2013/0206398 | A1 | 8/2013 | Tufano et al. |
| 2014/0110167 | A1 | 4/2014 | Goebel et al. |
| 2014/0172306 | A1 | 6/2014 | Brannigan et al. |
| 2015/0233232 | A1 | 8/2015 | Rodney et al. |
| 2015/0285937 | A1 | 10/2015 | Keller et al. |
| 2015/0337653 | A1 | 11/2015 | Hill et al. |
| 2016/0115778 | A1 | 4/2016 | van Oort et al. |
| 2017/0241221 | A1 | 8/2017 | Seshadri et al. |
| 2018/0120865 | A1 | 5/2018 | Nuryaningsih et al. |
| 2018/0171773 | A1 | 6/2018 | Nessjoen et al. |
| 2019/0033898 | A1 | 1/2019 | Shah et al. |
| 2019/0120044 | A1 | 4/2019 | Langnes et al. |
| 2019/0120047 | A1 | 4/2019 | Jin et al. |
| 2019/0203585 | A1 | 7/2019 | Nguyen et al. |
| 2019/0242253 | A1 | 8/2019 | Felkl et al. |
| 2019/0257972 | A1* | 8/2019 | Palmer ..................... G01V 1/42 |
| 2019/0353557 | A1 | 11/2019 | Zhang et al. |
| 2020/0256187 | A1* | 8/2020 | Lakings ............... E21B 49/003 |
| 2021/0025383 | A1* | 1/2021 | Bodishbaugh .......... F04B 47/02 |

FOREIGN PATENT DOCUMENTS

| WO | 2016185435 A1 | 11/2016 |
| WO | 2018117890 A1 | 6/2018 |
| WO | 2018217201 A1 | 11/2018 |

OTHER PUBLICATIONS

Xiaofan Tang, "International Preliminary Report on Patentability Regarding International Application No. PCT/US2020/064303", dated Jun. 23, 2022, p. 11, Published in: CH.

Nora Lindner, "International Preliminary Report on Patentability Regarding International Patent No. PCT/US2020/064327", dated Jun. 23, 2022, p. 7, Published in: CH.

Xin Wang, "International Preliminary Report on Patentability Regarding International Patent No. PCT/US2020/064314", dated Jun. 23, 2022, p. 9, Published in: CH.

Thomas, Shane, "International Search Report and Written Opinion Regarding International Application No. PCT/US20/64294", dated Apr. 21, 2021, p. 13, Published in: US.

Young, Lee, "International Search Report and Written Opinion Regarding International Application No. PCT/US20/064303", dated Mar. 4, 2021, p. 16, Published in: US.

Thomas, Shane, "International Search Report and Written Opinion Regarding International Application No. PCT/US2020/64314", dated Mar. 4, 2021, p. 15, Published in: US.

Anderson, "Fighting Water With Water How Engineers Are Turning the Tides on Frac Hits", Dec. 4, 2018, p. 10, Publisher: Abra Controls Inc.

American Petroleum Institute, "Wellbore Pressure and Fluid Communication Associated Mith Hydraulic Fracturing", 2014, pp. 1-4, Publisher: American Petroleum Institute, Published in: US.

Baig et al., "Do Hydraulic Fractures Induce Events Large Enough to Be Felt on Surface", "CSEG Recorder", Oct. 2012, p. 11, Publisher: Retrieved from https://csegrecorder.com/articles/view/do-hydraulic-fractures-induce-events-large-enough-to-be-felt-on-surface on Nov. 22, 2019, Published in: CA.

Daneshy et al., "Fracture Shadowing: a Direct Method for Determining of HTE Reach and Propagation Pattern of Hydraulic Fractures in Horizontal Wells", "SPE Hydraulic Fracturing Technology Conf.", 2012, pp. 1-9, Publisher: Society of Petroleum Engineers.

fibrecompletions.com, "Distributed Acoustic Sensing Systems (DAS)", , p. 7, Publisher: Retrieved from https://fibrecompletions.com/distributed-acoustic-sensing-das/ on Oct. 21, 2019.

(56) References Cited

OTHER PUBLICATIONS

Elmer, William, "Abstract for 2017 ALRDC Seminar on New Artifical Lift Technology: Smart ESD With Frac Hit Detection", 2017, p. 2.
Halliburton, "Frac Communication", , p. 1, Publisher: Retrieved from https://ww.halliburton.com/en-US/ps/testing-subsea/reservoir-testing-analysis/data-acquisition/spidr/frac-communication.html on Nov. 22, 2019.
Halliburton, "SPIDR—Self Powered Intelligent Data Retriever", , p. 3, Publisher: Retrieved from https://www.halliburton.com/en-US/ps/testing-subsea/reservoir-testing-analysis/data-acquisition/spidr.html on Nov. 22, 2019.
Zheng et al., "Frac-Hits Mapped by Tube Waves: a Diagnostic Tool to Complement Microseismic Monitoring", "2018 SEG International Exposition and Annual Meeting, Oct. 14-19, Anaheim, California, USA", Oct. 14, 2018, pp. 2887-2891.
Haydu, Carter, "Sensor Suite Illuminates Downhole Fracture Development, Production Efficiency", "New Technology Magazine Special Issue", 2015, pp. 12-17.
Jacobs, Trent, "Innovative Pressure Map Offers Insights on Frac Hits", Aug. 7, 2018, p. 5, Publisher: Retrieved from https://pubs.spe.org/en/jpt/jpt-article-detail/?art=4462 on Oct. 21, 2019.
Jacobs, Trent, "To Solve Frac Hits, Unconventional Engineering Must Revolve Around Them", Feb. 8, 2019, p. 19, Publisher: Retrieved from https://pubs.spe.org/en/jpt/jpt-article-detail/?art=5089 on Oct. 18, 2019.
Jin et al., "Machine Learning-Based Fracture-Hit Detection Algoritm Using LFDAS Signal", "The Leading Edge", Jul. 1, 2019, p. 12, vol. 38, No. 7.
Jacobs, Trent, "To Right Size Fractures, Producers Adopt Robust Monitoring and Custom Completions", Sep. 1, 2019, p. 17, Publisher: Retrieved from https://pubs.spe.org/en/jpt/jpt-article-detail/?art=5862.
Maxwell, Shawn, "What Does Microseismic Tell Us About Hydraulic Fracture Deformation", Oct. 2011, pp. 30-45, Publisher: CSEG Recorder.
Merkel Technologies Ltd., "Particle Imaging Analysis—Flowcam: Oil and Gas", , p. 6, Publisher: Retrieved from merkel.co.il/flowcam-oil-and-gas on Feb. 6, 2020.
Molenaar et al., "Field Cases of Hydraulic Fracture Stimulation Diagnostics Using Fiber Dptic Distributed Acoustic Sensing (DAS) Measurements and Analyses", "SPE Unconventional Gas Conference and Exhibition, Jan. 28-30, Muscat, Oman", 2013, p. 10, Publisher: Society of Petroleum Engineers.
Oleumtech, "Minimizing Risk and Well Damage From Frac Hits", Jan. 8, 2019, p. 7, Publisher Retrieved from https://oleumtech.com/news-and-blogs/2019/01/wireless-solution-for-minimizing-well-damage-from-fracking on Oct. 21, 2019.
Platt et al., "Estimating the Creation and Removal Date of Fracking Ponds Using Trend Analysis of Landsat Imageryu", "Environmental Management", 2018, pp. 310-320, vol. 61, Publisher: Springer.
Richter, Pete, "High-Resolution Das in Frac Design", Jul. 30, 2019, p. 6, Publisher: Retrieved from https://www.hartenergy.com/exclusives/high-resolution-das-frac-design-180999 on Oct. 12, 2019.
Richter et al., "Hydraulic Fracture Monitoring and Optimization in Unconventional Completions Using a High-Resolution Engineered Fibre-Optic Distributed Acoustic Sensor", "First Break", Apr. 2019, pp. 63-68, vol. 37.
Sardinha et al., "Determing Interwell Connectiity and Reservoir Complexity Through Frac Pressure Hits and Production Interference Analysis", "SPE/CSUR Unconventional Resources Conference—Canada held in Calgary, Alberta, Canada, Sep. 30, 2014-Oct. 2, 2014", 2014, p. 14, Publisher: Society of Petroleum Engineers, Published in: CA.
Tary et al., "Interpretation of Resonance Frequencies Recorded During Hydraulic Fracturing Treatments", "Journal of Geophysical Research: Solid Earth", Feb. 4, 2014, p. 47, vol. 119, No. 2, Publisher: Retrieved from https://agupubs.onlinelibrary.wiley.com/doi/full/10.1002/2013JB010904 on Oct. 21, 2019.
Triepke, Joseph, "The Fracking Problem With Over Drilling", , p. 7, Publisher: Retrieved from https://www.alpha-sense.com/insights/fracking-problem-overdrilling on Oct. 18, 2019.
Vaidyanathan, "Hydraulic Fracturing: When 2 Wells Meet, Spills Can Often Follow", Aug. 5, 2013, p. 4, Publisher: Retrieved from https://www.eenews.net/stones/1059985587 on Oct. 18, 2019.
Zborowski, Matt, "Can Machine Learning Mitigate Frac Hits?", Nov. 2, 2018, p. 5, Publisher: Retrieved from https://pubs.spe.org/en/jpt/jpt-article-detail/?art=4762 on Nov. 25, 2019.
Copenheaver, Blaine, "International Search Report and Written Opinion Regarding International Application No. PCT/US2020/064327", dated May 24, 2021, p. 12, Published in: US.
Chen et al., "Toward the Origin of Long-Period Long-Duration Seismic Events During Hydraulic Fracturing Treatmeant: a Case Study in the Shale Play of Sichuan Basin, China", "Seismilogical Research Letters", Jun. 2018, pp. 1075-1083, vol. 89, No. 3.

\* cited by examiner

SPECTRAL ANALYSIS, MACHINE LEARNING, AND FRAC SCORE ASSIGNMENT TO ACOUSTIC SIGNATURES OF FRACKING EVENTS

CLAIM OF PRIORITY UNDER 35 U.S.C. § 119

The present application is a national phase application based on PCT/US20/64294 filed Dec. 10, 2020 which claims priority to U.S. Provisional Application No. 63/058,548 entitled "Spectral Analysis, Machine Learning, and Frac Score Assignment to Acoustic Signatures of Fracking Events" filed Jul. 30, 2020, and assigned to the assignee hereof and hereby expressly incorporated by reference herein. The present Application also claims priority to U.S. Provisional Application Nos. 62/945,929, 62/945,949, 63/058,534, 62/945,953, and 62/945,957 entitled "Spectral Analysis and Machine Learning to Detect Offset Well Communication Using High Frequency Acoustic or Vibration Sensing", "Acoustic and Vibrational Sensor Based Micro-Seismic Analysis", "Spectral Analysis and Machine Learning of Acoustic Signature of Wireline Sticking", "Spectral Analysis and Machine Learning of Well Activity Using High Frequency Pressure Sensing of Phase-Locked Stimulation", and "Spectral Analysis and Machine Learning of Acoustic Signature of Drill Bit Positive Displacement Motor Torque and Drill Bit Wear", respectively, each of which are assigned to the assignee hereof and hereby expressly incorporated by reference herein.

FIELD OF THE DISCLOSURE

The present disclosure relates generally to oil field monitoring. In particular, but not by way of limitation, the present disclosure relates to systems, methods and apparatuses for spectral analysis of acoustic signals associated with drilling and completions operations.

DESCRIPTION OF RELATED ART

Unconventional reservoirs include reservoirs such as tight-gas sands, gas and oil shales, coalbed methane, heavy oil and tar sands, and gas-hydrate deposits. These reservoirs have little to no porosity, thus the hydrocarbons may be trapped within fractures and pore spaces of the formation. Additionally, the hydrocarbons may be adsorbed onto organic material, for instance, of a shale formation. In some cases, these reservoirs may require special recovery operations distinct from conventional operating practices in order to mobilize and extract the oil.

The rapid development of extracting hydrocarbons from these unconventional reservoirs can be tied to the combination of horizontal drilling and induced fracturing (also called "hydraulic fracturing" or simply "fracking") of the formations. Hydraulic fracturing operations may include at least drilling of a well or borehole into the subterranean formation, perforation gun (or perf gun) firing, frac fluid pumping, proppant pumping, and plug installation. Horizontal drilling has allowed for drilling along and within hydrocarbon reservoirs of a formation to capture the hydrocarbons trapped within the reservoirs. In some cases, an amount of mobilization may be related to the number of fractures in the formation and/or the size of existing fractures. Thus, increasing the number of fractures in the formation and/or increasing the size of existing fractures through fracking may serve to increase mobilization.

Modern drilling and fracking operations often rely on lab-generated geological suggestions for determining one or more of: an appropriate stage time, timing of proppant release, perforation gun power, pH of fracking solution, fracking pressure, etc. In some cases, these suggestions may be calculated using computer-simulated models that take into account results from previous fracking operations. Besides being computationally expensive, existing computer-simulated models are not suited for providing real-time feedback. While micro seismic data can be used to provide some level of real-time analysis of fracking operations, existing techniques are lacking in resolution. In some aspects, greater resolution using micro seismic data may serve to benefit operations. As an example, while the rough location and path of a crack maybe known, the resolution provided using existing techniques may not allow a user to accurately confirm if a given crack joins another crack or a well (e.g., a crack and the well may appear to intersect, but the resolution may be too low, making this difficult to confirm).

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

Aspects of the present disclosure generally relate to analyzing high frequency acoustic or vibration signals in a well to assess well activity in real-time via time domain and/or spectral analysis of said signals. These can be compared to static or absolute pressure readings that have long been used to obtain much lower resolution and non-real time insights into subterranean activity. In some cases, the analyzed signals may be transmitted from the lower reaches of the well to the surface, for instance, through liquid in the well. This may not only allow real-time feedback during well operations but may also allow computer algorithms to assign quantitative scores to drilling activities by comparing the feedback to feedback previously received as a result of certain fracking operations or subterranean activity (e.g., fracture initiation or high rate of fluid flow through a propped fracture). In this way, the computed scores may be used to provide real-time feedback to human operators, which may in turn allow them to adjust well operations. In other cases, the real-time feedback may be used to automatically adjust well operations. Real-time feedback may facilitate optimizing well output/yield and/or identify potential problems that could take the well offline (i.e., unusable), threaten the safety of human operators, ground water resources and/or equipment, to name a few non-limiting examples.

Some embodiments of the disclosure may relate to a method of providing real-time quantitative feedback for a fracking operation. The method can include providing a sensor configured for direct fluid communication with fluid within a well. In some examples, the sensor may comprise an acoustic or vibration sensor. In some examples, the method can further include acquiring acoustic or vibration data via the sensor in a time domain. In some cases, the method can further include converting the time domain acoustic or vibration data from the sensors to a frequency domain, for instance, using a fast Fourier transform (FFT) algorithm. Additionally, the method can include comparing the acoustic or vibration data in the frequency domain to a model trained on frequency domain signatures, where the frequency domain signatures correspond to known subterranean fracture parameters. In some cases, fracture parameters may include a number (e.g., of cracks), a location, a depth, intersection with one or more other fractures, intersection with wellbore, cracks propped or not, size of fracture and/or cracks, length of fracture and/or cracks, cross section of cracks, volume flow through cracks, frac initiation, communication between wells, horizontal shifting, to name a few non-limiting examples. In some embodiments, the method can include assigning a frac score to the acoustic or vibration data and/or one or more subterranean fractures that caused the acoustic or vibration data, based on the comparing.

Some embodiments of the disclosure may relate to a system for classifying fracture quantity and quality or fracturing operation activities during hydraulic fracturing operations, the system comprising: a sensor coupled to a fracking wellhead, circulating fluid line, or standpipe of a well and configured to convert acoustic vibrations infracking fluid in the fracking wellhead into an electrical signal; a memory configured to store the electrical signal; a converter configured to access the electrical signal from the memory and convert the electrical signal in a window of time into a current frequency domain spectrum; a machine-learning system configured to classify the current frequency domain spectrum, the machine-learning system having been trained on previous frequency domain spectra measured during previous hydraulic fracturing operations and previously classified by the machine-learning system; and a user interface configured to return a classification of the current frequency domain spectrum to an operator of the fracking wellhead.

Some other embodiments of the disclosure may relate to a method of classifying fracture quantity and quality during hydraulic fracturing operations, the method comprising: providing a sensor coupled to a wellhead, circulating fluid line, or standpipe of a well and configured to convert acoustic vibrations in fluid in the well into an electrical signal in a time domain; recording the electrical signal to a memory; converting the electrical signal for a window of time to a current frequency domain spectrum comprising one or more amplitude spikes, the current frequency domain spectrum constituting a measured frequency signature; analyzing the current frequency domain spectrum via a machine-learning system trained on previous frequency domain spectra measured during previous hydraulic fracturing operations and previously classified by the machine-learning system; and classifying the current frequency domain spectrum as associated with initiation of a fracture in the well with greater accuracy and lower latency than achievable with a micro seismic sensor array; and returning a classification of the current frequency domain spectrum to a well operator.

In yet other embodiments, the disclosure may relate to a method of improving fracture quantity and quality in hydraulic fracturing operations, the method comprising: performing a first fracking operation on a well in a subterranean formation; providing a sensor coupled to a wellhead, circulating fluid line, or standpipe of the well and configured to convert acoustic vibrations in fluid in the well into an electrical signal in a time domain; recording the electrical signal to a memory; converting the electrical signal for a window of time to a current frequency domain spectrum comprising one or more amplitude spikes, the current frequency domain spectrum constituting a measured frequency signature; analyzing the current frequency domain spectrum via a machine-learning system trained on previous frequency domain spectra measured during previous hydraulic fracturing operations and previously classified by the machine-learning system; classifying the current frequency domain spectrum as associated with initiation of a fracture in the well; and adjusting frac design parameters in near real-time based on this quantification and classification such as fracking pumping rate, bottom hole sand concentration to optimize fracture quantity and classification.

Some other embodiments of the disclosure may relate to a method of identifying downhole hydraulic fracturing operations in real time, the method comprising: providing a sensor coupled to a wellhead, circulating fluid line, or standpipe of a well and configured to convert acoustic vibrations in fluid in the well into an electrical signal in a time domain; recording the electrical signal to a memory; converting the electrical signal for a window of time to a current frequency domain spectrum comprising one or more amplitude spikes, the current frequency domain spectrum constituting a measured frequency signature; analyzing the current frequency domain spectrum via a machine-learning system trained on previous frequency domain spectra measured during previous hydraulic fracturing operations and previously classified by the machine-learning system; classifying the current frequency domain spectrum as associated with a downhole hydraulic fracturing operation; and returning a classification of the current frequency domain spectrum to a well operator.

Some embodiments of the disclosure may relate to a method of training a machine-learning model for hydraulic fracturing operations, the method comprising: providing a sensor coupled to a wellhead, circulating fluid line, or standpipe of a well and configured to convert acoustic vibrations in fluid in the well into an electrical signal in a time domain; recording the electrical signal to a memory; converting the electrical signal for a window of time to a current frequency domain spectrum comprising one or more amplitude spikes, the current frequency domain spectrum constituting a measured frequency signature; analyzing the current frequency domain spectrum via a machine-learning system trained on previous frequency domain spectra measured during previous hydraulic fracturing operations and previously classified by the machine-learning system; classifying the current frequency domain spectrum as associated with subterranean drilling or fracking activity; and wherein the machine-learning system is trained by grouping the current frequency domain spectrum with similar ones of the previous frequency domain spectra that are also associated with the subterranean drilling or fracking activity, and classifying each grouping.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
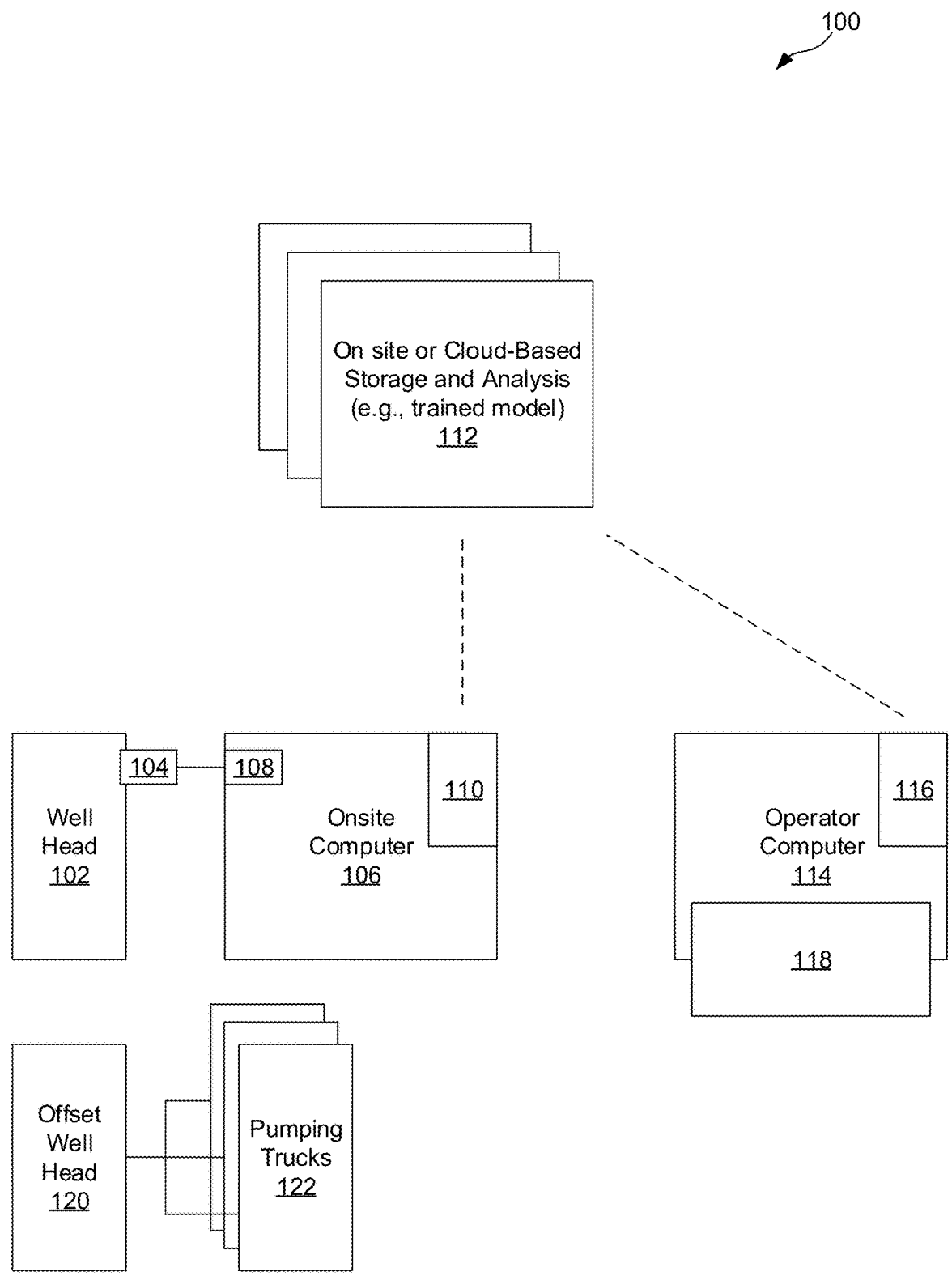
FIG. 1 illustrates a drilling system for monitoring acoustic or vibration signals in an observation well according to an embodiment of the disclosure.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The present disclosure relates generally to oil field monitoring. In particular, but not by way of limitation, the present disclosure relates to systems, methods and apparatuses for spectral analysis of acoustic signals received at a well head.

Acoustic and Vibration Pressure

Existing pressure sensing techniques for oil field monitoring involve recording pressure changes (e.g., absolute changes over long periods of time) with reference to an absolute pressure of fluid in the well. However, analyzing relative fluctuations or vibrations in the fluid in a well, for instance, in a frequency domain, rather than a time domain, may serve to provide a more accurate understanding of fracture dispersion, potential washout (i.e., is water or fluid going toward one crack because it is softer than others) and/or screen out situations, and fracture quality, to name a few non-limiting examples. In some cases, a quantitative frac score may be obtained by analyzing the fluctuations or vibrations in the fluid (i.e., via measurement of acoustics in the fluid), or alternatively, by feeling vibrations through a metal component of the wellhead. According to aspects of this disclosure, this assigned frac score may be used to determine a quality of fractures/cracks in the subterranean formation, and thus, a viability of oil production from a given well based on a current status of the well.

In some cases, this analysis may involve acquiring dynamic acoustic or vibration pressure data from the well's fluid (e.g., fracking fluid) and converting it into a frequency spectrum or frequency domain in some circumstances, the analysis can focus on repeating patterns, which may have a better correlation to underground events, and may travel through and be more easily discerned through thousands of feet of rock and sand formations, than one-off changes in absolute pressure (events that often take hours to register). In some cases, this spectrum may also be referred to as an acoustic or vibration spectral frequency signature (or a frequency signature). In some embodiments, the analysis may comprise generating machine learning (ML) models, or other artificial intelligence (AI) models, and training the models to recognize the acoustic or vibration signatures of different events. One non-limiting example of an event may comprise identifying whether a formed crack connects to the well or not. Once models have been trained to recognize the acoustic or vibration signatures of different events, real-time acquired data may be compared to the model or analyzed by the model for real-time assessment of a number, rate of creation, and quality of fractures being created in a given stage, which may be used to adjust fracking parameters such as stage timeline, pH, pressure, perforation gun pressure, etc. In some examples, the real-time acquired data may also be used to differentiate between actual crack openings and mere horizontal shifts in the subterranean formation. Current techniques often-times require operators to make decisions based on geological modeling performed hours before an operating step. Additionally or alternatively, operators rely on trial and error to make informed decisions before a particular step. However, the systems and methods disclosed herein alleviate some of the deficiencies of current techniques by utilizing real-time quantitative and qualitative analysis of crack formation and fluid flow via acoustic and vibration data to more accurately assess the choices that operators can make, and to optionally provide automated and optimized control of fracking operations.

In some embodiments, acoustic and vibration data and time or frequency analysis thereof, can be used relative to micro-fracture testing to define the stress field and fracture system in a well bore for the purpose of optimizing subsequent hydraulic fracturing well completion operations, further described below in relation to FIG. 5. Micro-fracture testing refers to isolating and pressurizing a relatively small zone of the bore hole with fluid so as to induce fracture of the formation surrounding the isolated zone, followed by analyzing the pressure in the well bore leading up to, during, and following the fracture in order to acquire information concerning the formation. In some examples, micro-fracture testing may be performed periodically during the drilling operation. Furthermore, the information acquired during the micro-fracture testing may subsequently be used to optimize the post-completion fracturing of the well bore. For the purposes of this disclosure, micro-fracture testing is to be distinguished from fracturing of the bore hole after completion of the drilling. Bore hole fracturing after completion of drilling is typically more intense than micro-fracturing, since bore hole fracturing is usually employed to facilitate the extraction of oil or gas from the well, in contrast to micro-fracture testing, which is employed for the acquisition of information concerning the formation. In some cases, the information acquired from micro-fracture testing may be used to estimate an initial frac score, further described below. In some cases, this initial frac score may be used to optimize the post-completion fracturing or even the continued drilling of the bore hole.

Acoustic and Vibration Sensors

Figure 14:
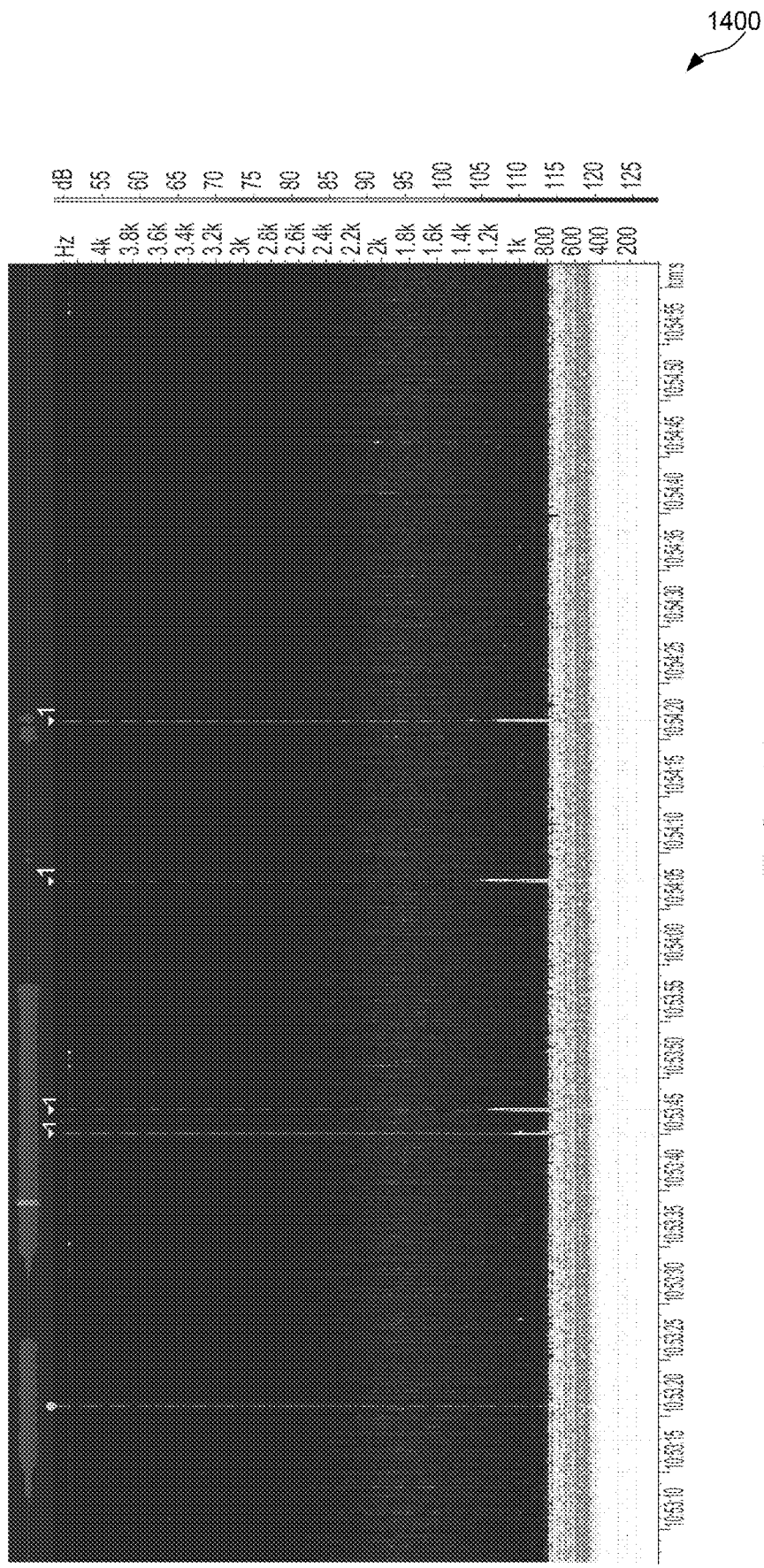
FIG. 14 illustrates one view of an exemplary spectral plot with frequency spikes associated with frac initiation in an observation well, in accordance with one or more implementations.
Figure 15:
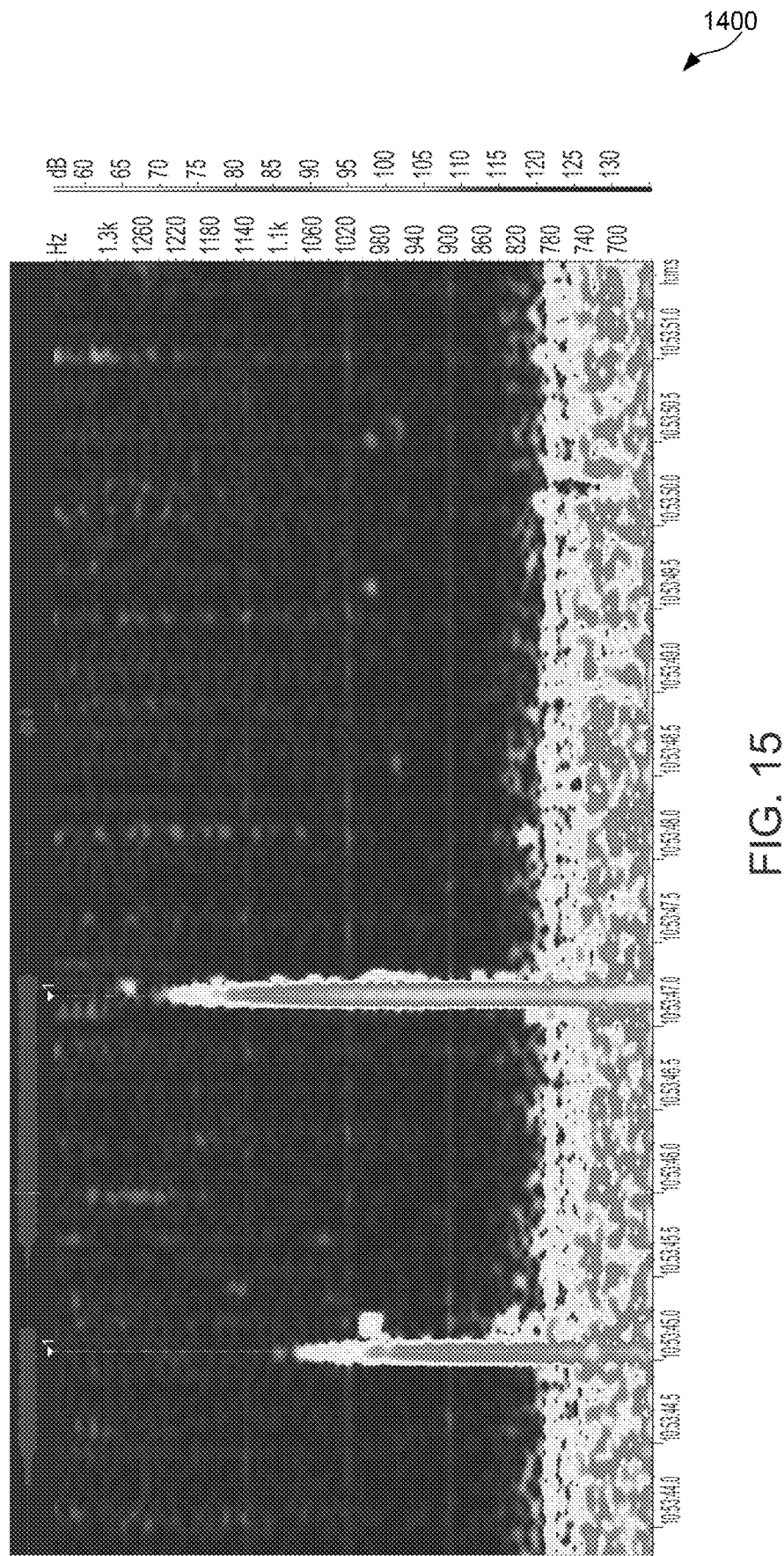
FIG. 15 illustrates a second view of the exemplary spectral plot in FIG. 14, in accordance with one or more implementations.
Figure 16:
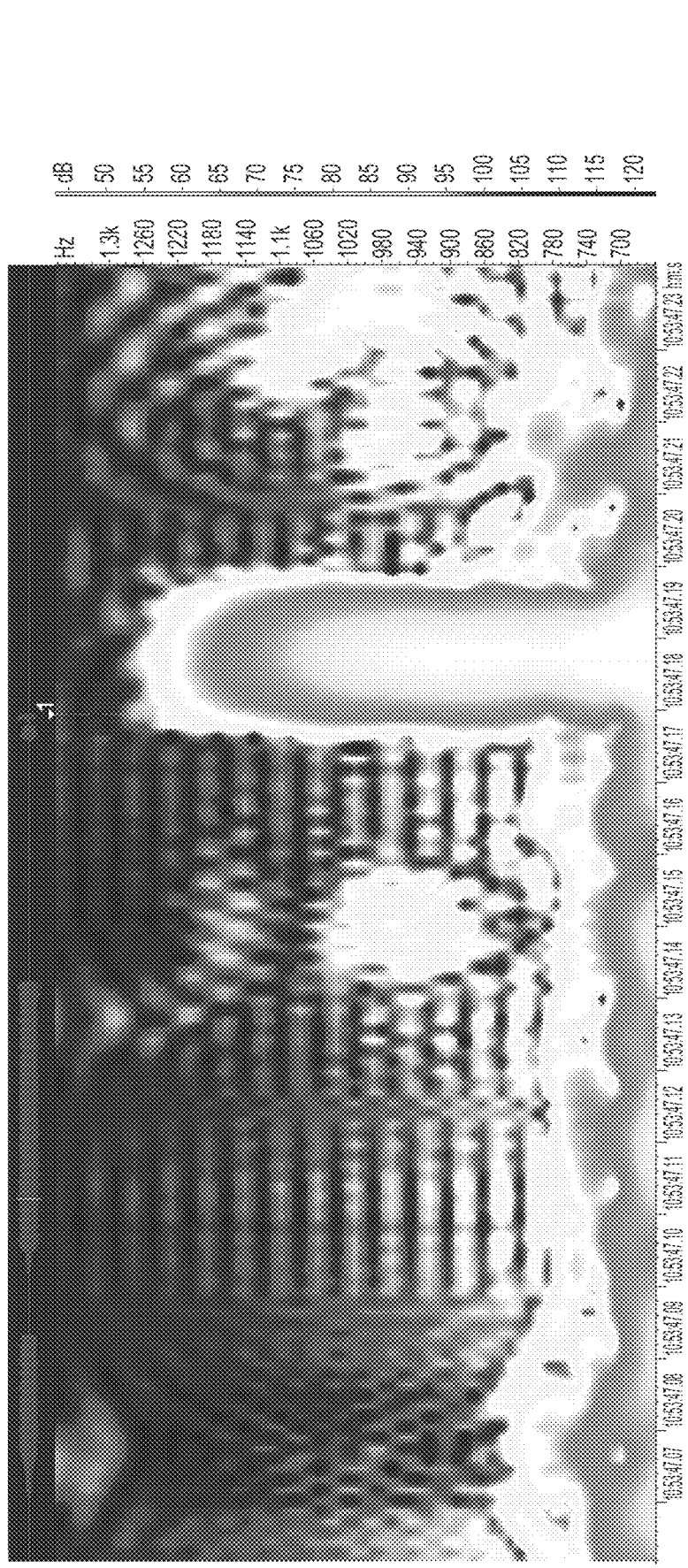
FIG. 16 illustrates a third view of the exemplary spectral plot in FIG. 14, in accordance with one or more implementations.

In some cases, the techniques described in this disclosure may utilize a high frequency (e.g., greater than 1 kHz) acoustic or vibration sensor directly coupled to a well, for instance at the well head. This acoustic or vibration sensor may be in direct physical contact with fluid in the well, the well casing, the well head pipe, the circulating fluid line, the standpipe, or the well pad (e.g., vibration sensors on the well pad can obviate the need to have direct contact with fluid in the well). In some embodiments, a vibration sensor need not be directly coupled to a component of the well, but instead can indirectly measure vibrations in the fluid. For instance, a laser reflecting off a surface of the well, such as a viewing window, could measure vibrations of the viewing window using optical methods. For the sake of brevity, an acoustic or vibration sensor may be used wherever the term acoustic sensor is seen in this disclosure. In some examples, the high frequency acoustic or vibration sensor may provide a digital or analog signal indicative of high frequency pressure fluctuations. Additionally or alternatively, the signal may be indicative of vibrations in the fluid. In some examples, this signal maybe passed to a conversion and analysis component, or a converter (e.g., spectrum analyzer), configured to identify frequency components of the signal (e.g., via an algorithm that transforms pressure or vibration data in the time domain to the frequency domain such as a Fast Fourier Transform (FFT) and compares the frequency domain signal to previously measured frequency domain signals or signatures). FIGS. 14-16 show examples of frequency spectra that were used to identify subterranean events such as fracture initiation or extension much sooner than is possible with traditional techniques, or using fewer sensors (e.g., one).

In some examples, the acoustic sensors described throughout this disclosure may or may not have a reference pressure. Furthermore, the acoustic sensors may be configured to measure at least changes in pressure. Thus, in some cases, the acoustic sensors may be configured to measure absolute pressure in addition to pressure changes (i.e., if a reference pressure is being used). Additionally or alternatively, for instance, if no reference pressure is being used, the acoustic sensors may be used in parallel with an absolute pressure sensor. In some cases, the absolute pressure sensor may be configured to measure static or absolute pressures, where the absolute pressure may be used as a baseline (or reference) for the higher sensitivity data from the acoustic sensor.

It should be noted that throughout this disclosure, a vibration sensor may be used in addition (or as an alternative) to a high frequency acoustic pressure sensor.

Acquiring Data

As previously noted, the term acoustic sensor may be broadly used to refer to a high frequency acoustic pressure sensor and/or a vibration sensor (e.g., sampling at ~1 kHz or greater). One non-limiting example of a vibration sensor may comprise a piezoelectric vibration sensor. In some cases, piezoelectric vibration sensors may be configured to generate a current or voltage proportional to an amount of piezoelectric material movement. The piezoelectric material can be in direct physical contact with the fluid in the well or may be physically coupled to a protective membrane that is in direct physical contact with the fluid. Either way, vibrations in the fluid may be transmitted to the piezoelectric material, which may cause movement or vibrations of the piezoelectric material. Movement of the piezoelectric material may generate a current or voltage, where the current or voltage may be proportional to the amount of vibration or movement of the piezoelectric material. The ICP Pressure Sensor, Model Number 113B23, is one non-limiting example of an acoustic or vibration sensor.

In some cases, the generated current or voltage may be recorded and stored, and there may be a 1 to 1 mapping of vibration data to current or voltage data. The measured current or voltage readings may be used to determine vibration data, for instance, by mapping the current or voltage readings to corresponding vibration values in a look-up table. In some cases, raw data may comprise one or more of the mapped vibration data, and the measured current and/or voltage readings. This raw data can be passed through a transform operation such as a Fourier Transform, and further analyzed in the frequency domain (e.g., via a spectrum analyzer), as described later.

In some cases, a Seismic Emission Tomography (SET) process comprises recording microseismic data using an array of sensors, located on or proximate the surface of the earth, in a well that is to be fractured, in another well or wells, or in one or more boreholes drilled for the purpose of placing sensors. Data is recorded at sensor locations in a digital format as a time series, referred to as a "trace," over a given time period. The duration of recording and the sampling interval is determined by the objectives of the microseismic data acquisition process, the characteristics of the events that generate the detected or sensed microseismic energy, the distances involved, the characteristics of the subsurface, and other factors. Once the seismic data has been recorded, it can be processed and converted to a set of data values that represent useful information, and that information may be displayed in a readily understandable format. The data recorded at each sensor location may be filtered and processed using SET processing techniques and software, that convert the data into a series of gridded subsurface volumes corresponding to multiple time samples. The values of the points in the grid represent attributes of the data, and such values vary over time as the energy emitted at each point in the subsurface varies. The solution to this problem may involve projecting back the microseismic energy to multiple possible points of origin in the subsurface. A microseismic event such as a fracture emits energy that is detected and recorded at multiple sensors. The microseismic data recorded at multiple sensor locations may be projected back to possible points of origin. If microseismic energy was emitted from a given point in the subsurface, then the data tends to add constructively at that point. If no energy was emitted from a given point in the subsurface, then the data cancels out. According to some embodiments of the SET process, each point in the subsurface grid may be treated as if it is a possible source of microseismic energy. Using a known or estimated seismic velocity model, it may be possible to compute the time of a release of energy at a point at a given depth in the subsurface takes to reach each sensor on or proximate the surface, where it is recorded as part of the seismic data trace for the sensor. Knowing this time, a time shift may be applied to the seismic data trace recorded at the sensor, such that the result is a seismic data trace corresponding to what might have been recorded at the point in the subsurface at which the energy was emitted.

Analysis of Acquired Data and Example Applications/Use Cases

Frequency Domain Analysis

In some examples, the transform component and the conversion and analysis component (e.g., converter or spectrum analyzer) may be implemented as a software program, firmware module, hardware comprising analog circuits, or a combination thereof. In some embodiments, a conversion function (e.g., Fourier Transform) may comprise the use of wavelet analysis techniques. In some cases, wavelet analysis may refer to the use of a custom function that is stretched and scaled. In some aspects, wavelet analysis may facilitate in optimizing analysis of detailed timing of events in a signal.

For the purposes of this disclosure, a conversion and analysis component (e.g., spectrum analyzer) may be configured to measure the magnitude of an input signal at different frequencies. Said another way, the conversion and analysis component may analyze signals in the frequency domain, rather than the time domain Typically, the conversion and analysis component may receive electrical signals as an input. In some other cases, the conversion and analysis component may receive acoustic or vibration signals via an appropriate transducer. In some embodiments, the conversion and analysis component may utilize a Fourier Transform or another applicable transform algorithm to convert raw acoustic or vibration data from the time domain to the frequency domain.

Fracking pads may include one or more acoustic sensors (e.g., one acoustic sensor for each well head) or one or more static and one or more acoustic sensors (e.g., one static and one acoustic sensor for each well head). The acoustic sensors may be high frequency pressure sensors (e.g., sampling at ~1 kHz or greater). Each fracking pad may include a transceiver for transmitting raw data from its sensor(s) to a local or cloud-based conversion and analysis component. Additionally or alternatively, the raw data may be transmitted to a processing resource that receives and analyses outputs from various conversion and analysis components. In one embodiment, a set of pads may comprise a master transceiver configured to receive data from one or more other pads on a local network. Each pad can transmit raw data or converted data (i.e., frequency domain data) to the master transceiver, and the master transceiver may transmit (i.e., relay) the data received on the local network to a cloud-based resource, such as a server farm where more complex analysis takes place (e.g., comparison to a model; training a model).

Further, the acoustic sensors may be coupled to one or more conversion and analysis components. In some cases, the number of conversion and analysis components may vary (e.g., one for each pad, one for each well head, or one for a network of sensors, to name a few non-limiting examples). The conversion and analysis component may be configured to execute an algorithm, such as a FFT algorithm, for transforming raw data from the time domain to the frequency domain in some other cases, the conversion and analysis component may be used in concert with another device or software module that can perform FFT.

Using spectral analysis rather than static pressure-based sensing enables higher signal to noise ratios than traditional static pressure-based sensors. For instance, a fracture initiation or extension may cause an acoustic pop or a rapid surge in acoustic energy at a certain frequency. Static (or absolute) pressure may not change or may see a very subtle change from this event, the type of pressure change that is difficult to discern from noise (typical variations in static/absolute pressure). However, when viewed in the frequency spectrum, this pop may look like the spectral signatures seen in FIGS. 14-16, sharp and well-defined peaks with large amplitude as compared to the spectral noise floor, and thus be easily delineated from steady state and other downhole events. As another example, the passage of fracking fluid through a fracture may result in a frequency signature that depends on the size of the fracture. By training a model based on frequency signatures of previous fractures, it is possible to associate a current frequency spectrum with a known fracture size, and thus use acoustic measurements to measure fracture size. Similarly, horizontal shifting, an event that does not improve hydrocarbon recovery, but does cause significant vibrations that may look like a fracture to traditional micro-seismic arrays, has a unique frequency signature compared to fracture initiation and extension. By comparing a current frequency signature to known signatures measured during previous horizontal shifts and fracture initiations or extensions, one can accurately distinguish between horizontal shifts and fracture initiation/extension.

In another example, fluid, mud, and proppant flowing through the well holes, perforations in stage walls, and fractures may also be associated with identifiable signatures in the frequency domain.

In another example, spectral analysis can predict early screenout. Screenout refers to a condition encountered during gravel-pack operations whereby a treatment area cannot accept further pack sand. In some cases, there may be a sudden increase in treatment pressure when screenout occurs. Under ideal conditions, screenout generally signifies that the entire void area has been successfully packed with sand. However, if screenout occurs too early in the treatment, it may indicate an incomplete treatment and the presence of undesirable voids within the pack zone. In some embodiments, a combination of raw time domain data and frequency spectra can be used to identify early screenout.

In another example, sand moving along edges of a pipe, well hole, or fracture may generate acoustic or vibration waves at a unique frequency (or frequencies) (e.g., at a different frequency or frequencies from signals generated by clean water moving through the same structure). In such cases, different areas associated with different geological and flow properties may be identifiable based on analyzing signals in the frequency domain in such cases, the conversion and analysis component may identify frequency signatures associated with specific activities and/or arriving from specific locations in the observation or offset well, where the identifying may be based at least in part on distinguishing between different processes or events during development of the well or offset well. In some cases, the frequency signatures may be dependent on fluid flow properties. As an example, a first area (e.g., where fluids become turbulent) may be associated with a frequency signature that is distinct from another frequency signature associated with a second area (e.g., associated with laminar fluid flow).

In another example, analyzing the frequency spectrum of acoustic signals in the fracking fluid allows identification of activities occurring in adjacent wells. For instance, a first well may be packing sand and gel into existing cracks, while a second adjacent well is opening fractures by pumping fluid down the borehole. According to aspects of this disclosure, the conversion and analysis component may be able to identify which signals are being caused by which well and/or which activity or operation is producing a given signal, for instance, based on given knowledge of the timing of the processes at nearby wells.

In some cases, sound or pressure waves may reflect off of various structures, interfaces between different fluids, etc., within a well. In such cases, the conversion and analysis component may be used to identify beat frequencies or resonances caused by such reflections. In one example, a pump truck may create a 33 Hz signal (i.e., a first frequency signature) during pumping operations. In some embodiments, the 33 Hz signal (i.e., frequency signature) may reflect off of one or more surfaces, including a heel of the well, toe of the well, one or more other structures at the well or well head, etc. In some cases, the reflective bouncing off of the one or more surfaces (e.g., one or more times per second for a 1-mile deep surface-to-heel well) may affect the resonant frequency identified by the conversion and analysis component. For instance, after reflecting and bouncing off of one or more surfaces and/or structures at the well head, a generated signal, such as the 33 Hz signal, may be identified as a ~1 Hz signal (or another frequency different from 33 Hz). In other words, the conversion and analysis component may identify a ~1 Hz signal as the resonant frequency for pump truck signals reflecting up and down through the vertical segment of a well (either the observation well or an adjacent well). In this way, the resonant frequency may be used to better understand the structure of a well, including one or more of the length of the borehole, length of horizontal sections, length of fractures extending from the horizontal section, etc.

In some examples, resonant frequencies may also be used in assessing dimensions and shapes of underground chambers, such as reservoirs or natural cracks, or the thickness of different layers of underground materials. All of these may present unique frequency spectra that an acoustic sensor at wellhead can measure and that can be matched with previous spectra associated with similar structures.

Raw Time Domain Analysis and/or Time & Frequency Domain Analysis

While this disclosure has discussed use cases where a source of a frequency signal is constant, such as that from fracking fluid passing through a perforation in a casing, in other embodiments, the source frequency may vary in time. Adjusting or sweeping a frequency of a source, such as a pump trump in an offset well, can create a signal that is more easily distinguished from background noise, than a static frequency signal. For instance, where a source is swept with a known rate of change, a monitoring system can not only look for the frequencies in the sweep, but also identify the rate of change of that frequency peak (or frequency peaks), thus providing a further 'fingerprint' that can be used to distinguish a signal from noise.

One application is a changing or sweeping frequency source, whose signal is monitored from an offset well, and in this way, subterranean structures or materials between the two wells can be monitored as the signal passes between the wells. For instance, a rock formation may resonate at a different frequency than a sand formation, and thus a bump (i.e., a variation) in amplitude at a certain frequency may be indicative of a rock formation between the offset well where the pumps are being swept in frequency, and the observation well that is monitoring for the sweeping frequency via acoustic or vibration sensors. As another example, modeling may show that a larger amplitude signal (e.g., a frequency signature) is generated and observed when a 40 Hz signal passes through a first shale as compared to a 35 Hz signal, whereas, in a second shale, a 30 Hz signal generates a larger amplitude frequency signature than a 35 Hz signal.

One example of changing a source frequency is that operators may vary and control a generated source frequency signal (e.g., from a pump truck) and monitor changes in the observed signal in the frequency and/or time domain for instance, rather than simply monitoring a 33 Hz pump truck signal, operators could perform a frequency sweep for the generated pump truck signal (e.g., by gradually adjusting a pump truck frequency through a range, such as 20 Hz to 40 Hz). In this example, the conversion and analysis component may be used to not only pick up on these unique frequencies (e.g., between 20 and 40 Hz) over background frequencies, but also monitor and observe the signal changing in the frequency domain as a function of time.

In another example, source frequency sweeping could be used to identify a structure or material based on optimal transmission frequencies. For instance, where a certain shale formation separates an observation well and another observation well coupled to pump trucks, the pump trucks' revolution per minute (RPMs) could be gradually adjusted until a highest amplitude signal (i.e., corresponding to an optimized frequency for travel through the shale formation between the wells) is observed by the conversion and analysis component. In this way, the sweeping could be used to identify different materials or structures since each may have optimal transmission frequencies. Similarly, this sweeping technique can be used to identify an optimal source frequency to later use during static frequency applications.

It should be noted that, pump trucks are just one example of an acoustic or vibration source, and different acoustic/vibration sources may be utilized in different embodiments. For instance, surface vibrators or surface oscillators used for releasing stuck drill strings may be used as acoustic or vibration sources. In some other cases, surface vibrators used to impart vibratory seismic energy into the ground may be used as acoustic/vibration sources. In yet other cases, an acoustic transducer, ultrasound transducer, sonar transducer, etc., may be used to inject energy into the system.

In some examples, energy produced at a target frequency may be used to optimize the fracking process. For example, energy signals at a particular target or resonant frequency (e.g., 20 Hz) may be used to induce and/or manipulate fractures. In some cases, the resonant frequency may be associated with a target fracture or chamber. Further, the induced signal may produce additive or constructive interference, thus allowing manipulation or control of fractures.

In some embodiments, underground events such as fracking fluid movement or fracture initiation can be the source of acoustic signals, and analysis can look both at the frequency spectra as well as the data in the time domain. By using a combination of analysis methods, more accurate identification of subterranean formations and events may be possible.

Machine Learning

Fourier Analysis

Some embodiments of this disclosure pass acoustic or vibration data in the frequency domain to a machine learning model for analysis, labeling, and training of the model. In some embodiments, the model may be configured to use artificial intelligence based on, for example, a neural network or other type of machine learning algorithm. In some cases, the artificial intelligence algorithm or model may receive time domain data converted to a frequency domain, for instance, using a FFT algorithm or another algorithm for computing the discrete Fourier transform (DFT) of a sequence. A DFT may be obtained by decomposing a sequence of values into components of different frequencies. In some cases, a conversion and analysis component may be utilized to perform the conversion from time to frequency domain in some other cases, the acoustic or vibration data in the time domain may be passed to a machine learning model without conversion. In such cases, the conversion and analysis component maybe responsible for analysis, but not conversion, of the time domain data. It should be noted that, even though no conversion of time domain data into the frequency domain takes place, the model may still have access to frequency information associated with the measured signal. In some cases, the model may look at a window of data in one shot (or one local section of a signal as it changes over time) and learn to detect, for instance, high and low frequency waveforms and structures. The model or neural network may encompass knowledge of frequency space decomposition of a signal and may be configured to deconstruct a single waveform in time into a composite of simpler, underlying waveforms (e.g., sinusoidal waveforms). Thus, in some aspects, the model may be trained to perform something akin to Fourier analysis. In some other cases, the model may utilize a Short-time Fourier transform (STFT) to determine the sinusoidal frequency and phase content of local sections of a signal as it changes over time. STFT computation may involve dividing a longer time signal into shorter segments of equal length and then computing the Fourier transform separately on each shorter segment. In some cases, once the Fourier spectrum is revealed for each shorter segment, the changing spectra may be plotted as a function of time (i.e., also known as a spectrogram or waterfall plot).

FIG. 1 illustrates a drilling system 100 for monitoring acoustic or vibration signals (referred to simply as, signals) in an observation well. The signals can either be sourced or generated at (or in) the observation well or an optional offset well. As shown, the drilling system 100 can include a well head 102 of the observation well and optionally an offset well having an offset well head 120. The well head 102 of the observation well can include a sensor 104 (e.g., acoustic or vibration sensor) in physical contact with fluid in the observation well or a component directly in contact with the fluid (e.g., a sensor affixed to an outside of the standpipe or wellhead). For instance, the sensor 104 can be arranged within the wellhead, a circulating fluid line, or the standpipe. Alternatively, the sensor 104 can be arranged at an end of a T-junction that runs roughly perpendicular to piping of the wellhead, a circulating fluid line, or the standpipe. Alternatively, the sensor 104 can be arranged within a pipe parallel to piping of the wellhead, circulating fluid line, or standpipe. The sensor 104 can generate a signal and pass said signal to an onsite computer 106, for instance, via an analog-to-digital converter (ADC) 108. The onsite computer 106 may be configured to process signals from one or more wellheads of a pad, or alternatively, from multiple pads. The onsite computer 106 can include a transceiver or antenna 110 configured to transmit raw acoustic or vibration data to a conversion and analysis component. As illustrated, the conversion and analysis component may comprise an on-site or cloud-based storage and analysis unit 112. In some examples, the conversion and analysis component maybe configured to convert the raw acoustic or vibration data from a time to a frequency domain further, the conversion and analysis component may be configured to identify frequency signatures indicative of one or more events. In some cases, identification of such events may further trigger a communication to an operator computer 114. Some non-limiting examples of such events may include a potential communication between wells, an eminent drill bit failure, wireline sticking, etc. In some cases, the operator computer 114 may be linked to the conversion and analysis component via a transceiver 116, and may further include a display 118 for providing visual warnings or other messages or indicators.

In some cases, the on-site or cloud-based storage and analysis unit 112 may include a trained model (e.g., as part of a machine-learning system) based on previous drilling or hydraulic fracturing operations and their frequency signatures (and optionally previously classified by the machine-learning system). For instance, the model may have been trained using acoustic or vibration data from previous drilling events, for instance, an event that led to a falloff in production. In some embodiments, the on-site or cloud-based storage and analysis unit 112 may be configured to provide automated feedback control to the well, for example, to reduce frac pressure, increase or decrease well spacing of future wells (or change a direction of a well to increase spacing between portions of adjacent wells)=, or perform another applicable action.

In some embodiments, the on-site or cloud-based storage and analysis 112 may monitor for a signature of pump trucks 122 pumping fluids into the offset well head 120. In some cases, these pump trucks 122 may operate at around 33 Hz. In such cases, the frequency signature (i.e., at 33 Hz) generated by the pump truck may have a greater amplitude than other frequency components generated by the illustrated drilling system 100.

In some cases, sound or pressure waves may reflect off of various structures, interfaces between different fluids or materials, etc., within a well or between wells. In such cases, the conversion and analysis component may be used to identify beat frequencies or resonances caused by such reflections. In some embodiments, the 33 Hz signal (i.e., a first frequency signature) generated by the pump truck may reflect off of one or more surfaces, including a heel of the well, toe of the well, one or more other structures at the well or well head, etc. In some cases, the reflective bouncing off of the one or more surfaces (e.g., one or more times per second for a 1-mile deep surface-to-heel well) may affect the resonant frequency identified by the conversion and analysis component. For instance, after reflecting and bouncing off of one or more surfaces and/or structures at the well head, a generated signal, such as the 33 Hz signal, may have a ~1 Hz beat frequency signal (or another frequency different from 33 Hz), corresponding to reflections. In other words, the conversion and analysis component may identify a ~1 Hz signal as the resonant or beat frequency for pump truck signals reflecting up and down through the vertical segment of a well (either the observation well or an adjacent well) in addition to the original 33 Hz signal. In this way, the resonant frequency may be used to better understand the structure of an observation or offset well, including one or more of the length of the borehole, length of horizontal sections, length of fractures extending from the horizontal section, etc.

Additionally or alternatively, operators may vary and control a generated source frequency signal (e.g., from a pump truck) and monitor changes in the observed signal in the frequency and/or time domain for instance, rather than simply monitoring the 33 Hz pump truck signal, an operator may perform a frequency sweep for the generated pump truck signal (e.g., by gradually adjust a pump truck frequency through a range, such as 20 Hz to 40 Hz). In this example, the conversion and analysis component maybe used not only to pick up on these unique frequencies (e.g., between 20 and 40 Hz) over background frequencies, but also to monitor and observe the signal changing in the frequency domain as a function of time. Additionally or alternatively, the source frequency may be adjusted to optimize travel through a given medium. For instance, where a certain shale formation separates an observation well (i.e., associated with well head 102) and an offset well (i.e., associated with offset well head 120) coupled to the pump trucks, the pump trucks' revolutions per minute (RPMs) could be gradually adjusted until a highest amplitude signal (i.e., corresponding to an optimized frequency for travel through the shale formation between the wells) is observed by the conversion and analysis component comprising the on-site or cloud-based storage and analysis unit 112. Operational measurements can then be taken based on this optimization of the source frequency.

Figure 2:
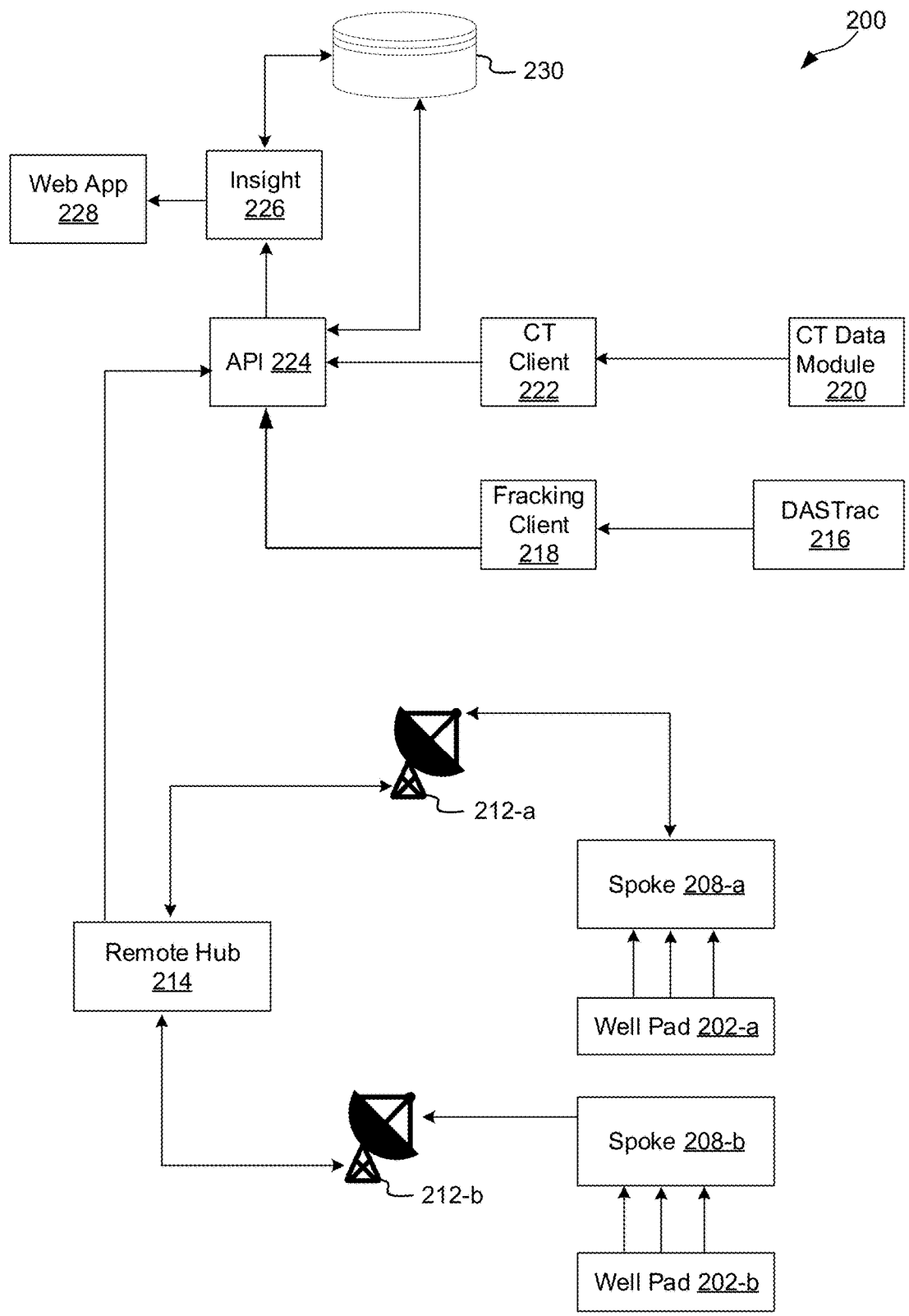
FIG. 2 illustrates a drilling system for monitoring acoustic or vibration signals in an observation well according to an embodiment of the disclosure.

FIG. 2 illustrates a drilling system 200 for monitoring acoustic or vibration signals in an observation well. In some examples, the drilling system 200 may implement one or more aspects of the figures described herein, including at least FIG. 1. As shown, drilling system 200 may comprise one or more well pads 202 (e.g., well pad 202-a, well pad 202-b), one or more spoke computers 208 (e.g., spoke computers 208-a, spoke computer 208-b), antenna systems 212 (e.g., antenna system 212-a, antenna system 212-b), a remote hub 214, and a database 230. While the illustrated embodiment shows two well pads 212, any number of well pads may be utilized. Each well pad 212 may include one or more well heads (shown as well head 102 in FIG. 1), where each well head can include a sensor (shown as acoustic sensor 104 in FIG. 1) and optionally an absolute pressure sensor (or static pressure sensor) directly coupled to fluids in the well (e.g., via the wellhead, circulating fluid line, or standpipe, to name a few non-limiting examples). Alternatively, each well may include an acoustic sensor and an optional absolute pressure sensor, and these sensors may not be directly coupled to fluids in the well via the well head. For instance, an adapter below the well head may be used to place the sensor(s) in direct communication with fluid in the well, or the vibration sensor may be coupled to a metal component (e.g., standpipe) of the well or well head.

The signals can either be sourced at the observation well (e.g., acoustic waves from a fracture initiation) or an adjacent or offset well (e.g., acoustic waves from a pumping truck). In some embodiments, the sensor(s) may be configured to couple to processors (e.g., Raspberry Pi) located in the spoke computers 208-a and/or 208-b. In some cases, a spoke computer 208 may comprise one or more processors for each well pad 202 in electronic communication with the respective spoke computer. In some embodiments, the one or more processors of the spoke computers 208 may be coupled to an antenna system 212. In some cases, the antenna system 212 may comprise an omnidirectional antenna, although other types of antennas are contemplated in different embodiments. Each antenna system 212 may be in communication with a wide area network (WAN), such as a 4G or 5G network. In another embodiment, the antennas of the antenna system 212 may form a local area wireless network wherein one of the antennas may be configured as an interface (e.g., a gateway) between the local area wireless network and a wide area network. In some embodiments, cellular (e.g., multi-beam antennas, sector antennas) or satellite (e.g., dish) antennas may be deployed for communication with a wide area network, to name a few non-limiting examples. Further, omnidirectional or Yagi type antennas, to name two non-limiting examples, may be utilized for local area network communication.

In some cases, the remote hub 214 may be in communication with the antenna systems 212 and the spoke computers 208. Further, the remote hub 214 may be configured to contact an insight program 226 via an Application Programming Interface (API) 224. In some examples, this communication may involve a local area network or a wide area network. Insight 226 may be configured to store data for a training model in the database 230, as well as to continually train the model using new data acquired from the acoustic sensors at the well heads. In some cases, the drilling system 200 may also support a web app 228 to provide one or more insights, warnings, feedback, and/or instructions to pad operators. In some examples, the web app 228 may be accessible via a user interface displayed on a user device (e.g., laptop, smartphone, tablet, etc.).

In some embodiments, the processors may comprise (or may be coupled to) a conversion and analysis component. In other embodiments, the processors may send their data through the network(s) to a centralized conversion and analysis component. In some cases, the centralized conversion and analysis component may or may not be located near the well pads 202. For instance, the centralized conversion and analysis component may be located off-site in some embodiments.

As illustrated, the drilling system 200 may further comprise one or more additional components, modules, and/or sub-systems, including, but not limited to, a Data Acquisition and Control System (DASTrac 216), a fracking client 218, a Coiled Tubing (CT) Data Acquisition module 220, and a CT client 222. In some cases, the DASTrac 216 may comprise a data acquisition and control program for acquiring fracking operations data from wellsite process control units and other sensors. Further, DASTrac 216 may be configured to display the acquired data from the data acquisition system in both numeric and graphical form in real time, which may enable operators to change job profiles, scale parameters, advance stages, change stages, and hold stages in response to seeing fracture scores, to name a few non-limiting examples. In some cases, the CT Data Acquisition module 220 may be configured to measure and control technological parameters of coiled tubing units during repair and stimulation operations of oil and gas wells. The CT Data Acquisition module 220 may also be configured to record the measured technological parameters on electronic media, and optionally display and visualize them on an operator's computer display. In some cases, the CT client 222 may be configured to access coiled tubing data from the CT Data Acquisition module 220, for instance, directly via the API 224. In the oil and gas industry, coiled tubing may refer to a long metal pipe, usually anywhere between 1 to 3.25 inches in diameter (although other diameters are contemplated in different embodiments), which is supplied spooled on a reel. In some cases, coiled tubing may be used for interventions in oil and gas wells, as production tubing in depleted gas wells, and/or as an alternative to a wireline (i.e., the coiled tubing may be used to carry out operations similar to a wireline). In some embodiments, coiled tubing may be configured to perform open hole drilling and milling operations. Further, due to their high pressure tolerance abilities (e.g., ranging from 55,000 PSI to 120,000 PSI), they may also be utilized to fracture a reservoir. In some cases, one or more sensors (not shown) may be coupled to the coiled tubing and sent downhole. The CT Data Acquisition module 220 may collect real-time downhole measurements from the sensors, where the measurements may be used to model the fatigue on the coiled tubing, predict coiled tubing performance, fluid behavior at modeled downhole well conditions, to name a few non-limiting examples. In some cases, the real-time downhole measurements collected by the CT Data Acquisition module 220 may also be used to optimize treatments, for instance, during interventions (i.e., when the well is taken offline).

The spoke computers can include memory for storing electrical signals, a current frequency domain spectrum, or both, measured by sensors at one or more well heads, circulating fluid lines, or standpipes at the well pads 202-*a* and 202-*b*. The database 230 can also include memory for storing electrical signals, a current frequency domain spectrum, or both, measured by sensors at one or more well heads, circulating fluid lines, or standpipes at the well pads 202-*a* and 202-*b*. The database 230 can also be configured to store frequency domain spectra measured during previous hydraulic fracturing operations. The database 230 can also include previous classifications or identifications of subterranean activities and events associated with the previous frequency domain spectra. This may include a mapping between events or structures (e.g., a size or location of a fracture) and previous frequency domain spectra. The database 230 may also store well outcomes associated with previous frequency domain spectra. For instance, an increase in well production after a fracking operation that resulted in some subterranean event (believed to be fracture initiation, extension or widening) that caused a certain previous frequency domain spectra. These outcomes can include well flow rate and fracture intersection with the wellbore, to name two non-limiting examples.

Figure 3:
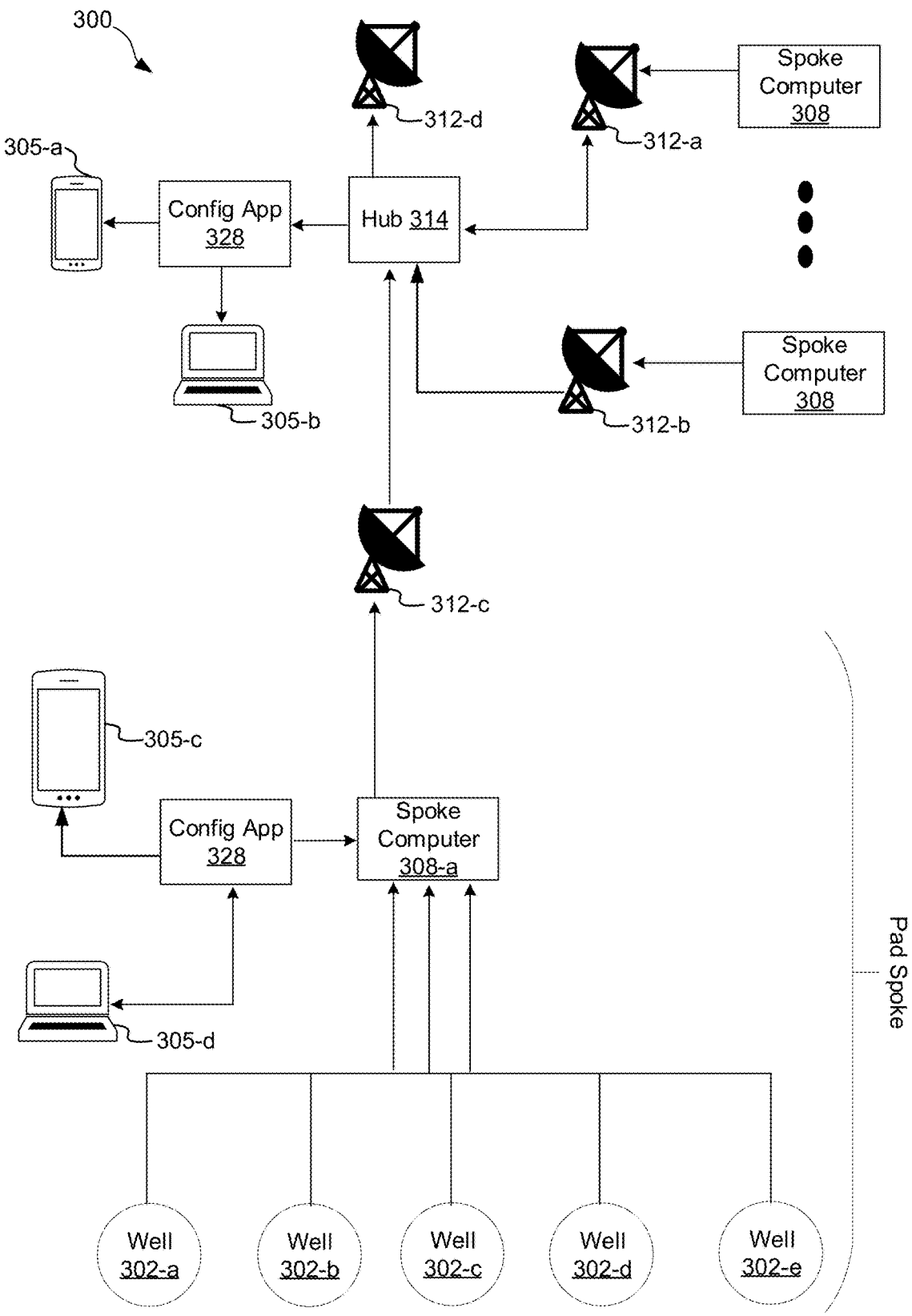
FIG. 3 illustrates a network structure for multiple spoke computers according to an embodiment of the disclosure.

FIG. 3 illustrates a network structure 300 for multiple spoke computers according to an alternate embodiment of the disclosure. As illustrated, the network structure 300 may comprise 'N' spoke computers 308, each including some or all the details shown in the spoke computer 308-*a*. In some examples, spoke computers 308 may be electronically and communicatively coupled to antenna systems 312. Further, each antenna system 312 may be in communication with a hub 314. Spoke computers 308, antenna systems 312, and hub 314 may be similar or substantially similar to spoke computers 208, antenna systems 212, and remote hub 214, respectively, previously described in relation to FIG. 2. In some examples, spoke computer 308-*a* may be in electronic communication with sensors (e.g., acoustic or vibration sensors) of a well pad (shown as well pad 202 in FIG. 2). As shown, the well pad may comprise one or more wells (i.e., wells 302-*a*, 302-*b*, 302-*c*, 302-*d*, and/or 302-*e*), each having an acoustic or vibration sensor. Further, these sensors may be configured to provide raw data (e.g., time domain acoustic or vibration signal data) to the spoke computer 308-*a*. In some embodiments, the spoke computers may be configured to wirelessly communicate with the hub 314. Furthermore, the hub 314 may be configured to communicate with a wide area network, for instance, via an antenna system 312 (e.g., 312-*d*). In some cases, one or more user/operator devices 305, such as user/operator devices 305-*a*, 305-*b*, 305-*c*, and/or 305 may be in communication with a configuration app 328. The configuration app (also referred to as config app 328) may be in communication with the hub 314 and may be used to assign sensors to particular wells 302 and/or spoke computers 308, for instance. The config app 328 may also be used for configuring one or more of the hub 314, the sensors, and the spoke computers 308.

Figure 4:
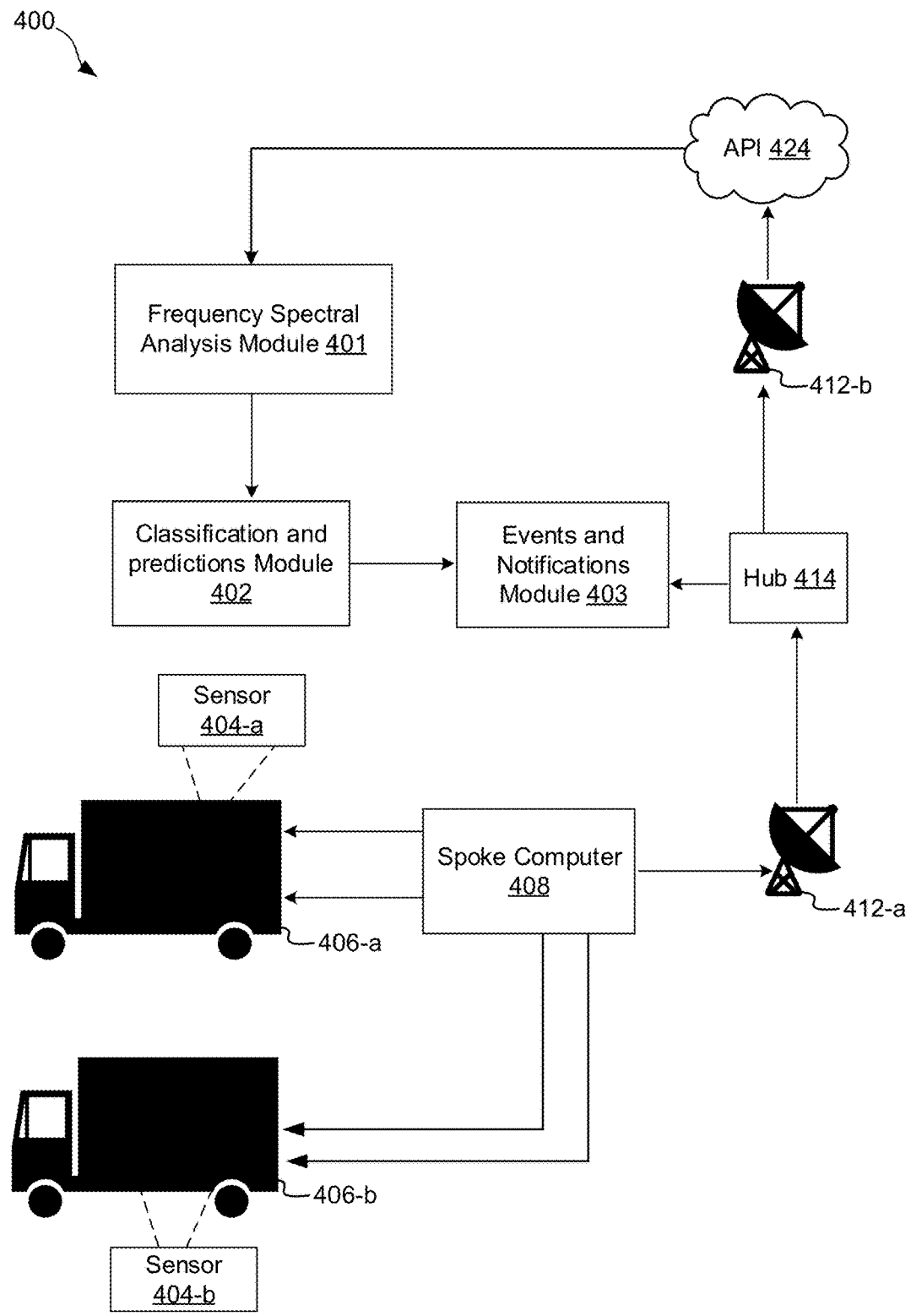
FIG. 4 illustrates a system for using frequency signatures of acoustic or vibration data to identify equipment failures according to an embodiment of the disclosure.

FIG. 4 illustrates a system 400 for using frequency signatures of acoustic or vibration data to determine a fracture score. In this illustration, one or more sensors 404 (e.g., sensor 404-*a*, sensor 404-*b*) are coupled to pump trucks 406 (e.g., pump truck 406-*a*, pump truck 406-*b*), where the one or more sensors 404 may be acoustic or vibration sensors. In some cases, the sensors 404 may be similar or substantially similar to the sensors 104 previously described in relation to FIG. 1. The sensors 404 can be configured to make direct or indirect measurements of acoustic or vibration waves in fracking fluid, for instance, via connection to a well's wellhead, circulating fluid lines, standpipe, or piping in a pump truck. In some embodiments, the sensors 404 may be configured to pass raw data (e.g., time domain acoustic or vibration signal data) to a spoke computer 408, which may implement one or more aspects of the spoke computers 208 and/or 308 described in FIGS. 2 and/or 3, respectively. Following reception of raw sensor data, the spoke computer 408 may transmit the raw data using wired or wireless communication to a hub 414. Alternatively, the spoke computer 408 may be configured to convert the raw data in the time domain to the frequency domain, for instance, using a FFT algorithm. As shown, the spoke computer 408 may be configured to communicate with the hub 414 using antenna system 412-*a*. Antenna systems 412 may be similar or substantially similar to the antenna systems 212 and 312 described in relation to FIGS. 2 and 3. The antenna systems 412 may comprise one or more of omnidirectional, Yagi, dish, and cellular antennas, to name a few non-limiting examples.

After hub 414 receives the data (e.g., raw data, or frequency domain sensor data) from spoke computer 408, it may further relay said data on to a frequency spectral analysis module 401 via antenna system 412-b and/or API 424. The API 424 may implement one or more aspects of API 224 discussed in relation to FIG. 2. In some examples, for instance, if the hub 414 receives time domain data from the spoke computer 408, the hub 414 may transmit the time domain data to a conversion and analysis component and receive converted frequency domain data, prior to relaying the frequency domain data to the API 424.

As illustrated, the frequency spectral analysis module 401 may be electronically and communicatively coupled to a classification and prediction module 402. The classification and prediction module 402 may be configured to determine if the frequency spectrum of the raw data aligns with signatures for known subterranean activity, such as fracture initiation, fracture extension, horizontal shifting, fracture intersection with well-bore, and fracture intersection with another fracture, to name a few non-limiting examples. Alignment with frequency signatures for known sizes, such as diameter and length of a fracture may also be looked for. If such a classification occurs, then an events and notification module 403 may be activated. In some circumstances, the events and notification module 403 may be configured to issue an indication to an operator of the pump truck 406 or well. Alternatively or in parallel, the classification and prediction module 402 may be configured to analyze raw time series data and determine if this raw data aligns with known time series signatures. If such a classification occurs, the events and notification module 403 may be activated to send an indicator to an operator.

Additionally or alternatively, the classification and prediction module 402 may be configured to analyze raw time series data and estimate a level of frac dispersion (i.e., are cracks dispersed or concentrated) and/or washout (i.e., is water going toward one crack because it is softer than other crack(s)), or even predict screenout. As described later in the disclosure, a frac score may be assigned based on the estimations and/or predictions by the classification and prediction module 420. Furthermore, as previously described, in some cases, fluid, mud, and proppant flowing through the well holes, perforations in stage walls, early screenout, washout, and/or fractures may be associated with identifiable signatures in the frequency domain for instance, in one example, early screenout may be predicted by using a combination of raw time domain data and frequency spectra. In some cases, early screenout and/or washout may be associated with a lower frac score.

Figure 5:
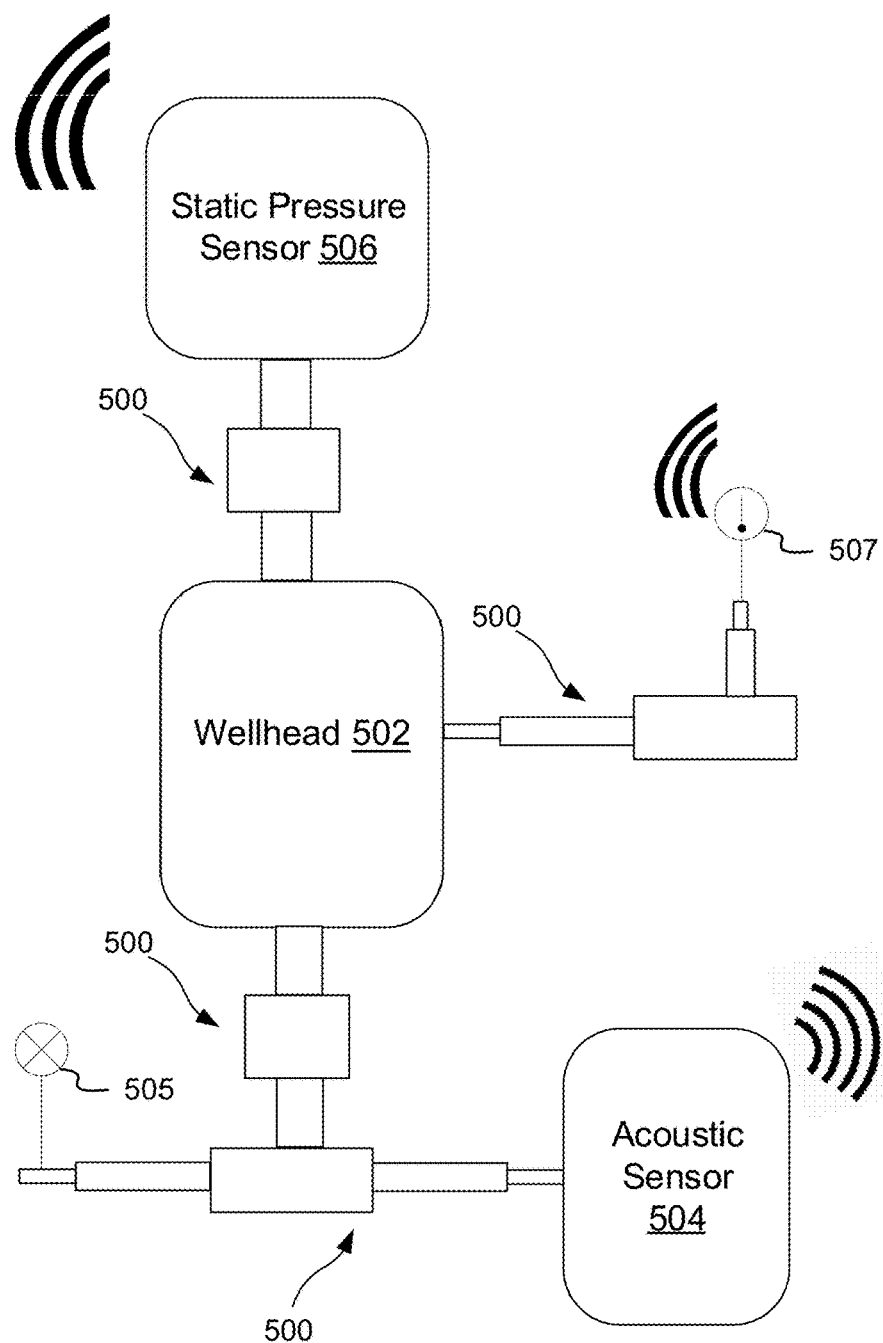
FIG. 5 illustrates a well head embodying the herein-disclosed acoustic sensor in accordance with one or more implementations.

FIG. 5 illustrates a wellhead assembly 500 comprising a wellhead 502 and one or more sensors. As shown, the wellhead 502 may include several interfaces for various sensors such as a casing pressure sensor 505, a static pressure sensor 506, a tubing temperature sensor 507, an acoustic or vibration sensor 504, etc. In some embodiments, different sensors may be provided for the tubing and the casing since these are separate fluid paths. It should be noted that, the sensors depicted in FIG. 5 are not intended to be limiting, and more or fewer sensors may be utilized in other embodiments. For instance, in some examples, a tubing pressure sensor may be provided in addition to the casing pressure sensor 505. Additionally or alternatively, a casing temperature sensor may be provided along with the tubing temperature sensor 507. In some embodiments, the herein disclosed acoustic or vibration sensor 504 may be coupled to one of the interfaces of the wellhead 502, such that the acoustic or vibration sensor 504 is in direct physical contact with fluid in the wellhead 502. In some examples, the acoustic or vibration sensor 504 may comprise wireless transmission hardware for supporting communication with a spoke computer, hub, or wide area network (not shown).

In some cases, micro-fracturing in a well bore may be performed to define the stress field and fracture system, for instance, to optimize hydraulic fracturing well completion operations. It should be noted that, micro-fracturing is to be distinguished from fracturing of the bore hole after drilling, which is typically more intense and is done in order to facilitate the extraction of oil or gas from the well. In other words, micro-fracture testing may be performed for acquisition of information concerning the formation and may be used to optimize fracturing. In some cases, the sensors illustrated in FIG. 5, especially the pressure sensors, may be used for micro-fracture testing. Micro-fracture testing may also be used to estimate frac scores as described later in the disclosure.

In some cases, acoustic data can be supplemented by graphs of pressure versus time and pressure versus pumped volume. These may be generated by a surface computer system (or alternatively, a remote computer system). An operator or user may control the conduct of the test based on the generated graphs. For example, the operator may run the pump pressurizing the bore hole until a drop off or leveling out of the pressure becomes evident, indicating that significant fracturing has occurred. In some cases, after the pump is shut down, the operator may continue to monitor the graph of pressure versus time in the bore hole. Examination of this data, together with surface pressure and flow data, may be used to determine the pressure at which fracture initiation occurs (i.e., the bore hole pressure below which the fractures will begin to close), when fractures are propagated (i.e., pressures at different flow rates (fracture conductivity)), and when primary and potentially later closure pressures are attained (i.e., when the test is completed).

In some cases, micro-fracture testing, unlike leak off tests, may be performed a number of times along the well bore within the producing reservoir. Microfracture testing may be used to study when and how fractures develop as pressure increases (e.g., a slight decrease in pressure may be observed when a fracture occurs when pressure rises to X). Study of microfracture testing graphs may also provide insight on how cracks propagate, as well as how fluids flow into extending or open fractures (e.g., after the slight drop in pressure from X, constant pressure Y may be observed despite the pump continuing to pump fluid into an isolated zone of the bore hole), all of which may be associated with a frac score. Furthermore, microfracture testing may also be used to understand the closure of fractures as pressure reduces. For instance, when the pump is stopped, a decay in pressure may be observed even though fluid continues to seep into the formation. However, in some circumstances, the rate of pressure decay may reduce over time, which is indicative of the closure of the fracture as the pressure reduces. In other words, as the fracture becomes smaller, the rate of fluid seepage into the formation, and therefore the rate of pressure decay, decreases. In some cases, after the pressure has decayed, the pressurization of the isolated zone may be repeated to gain additional information concerning the pressure(s) at which fractures in the formation proximate a zone of the bore hole will open and close.

Figure 6:
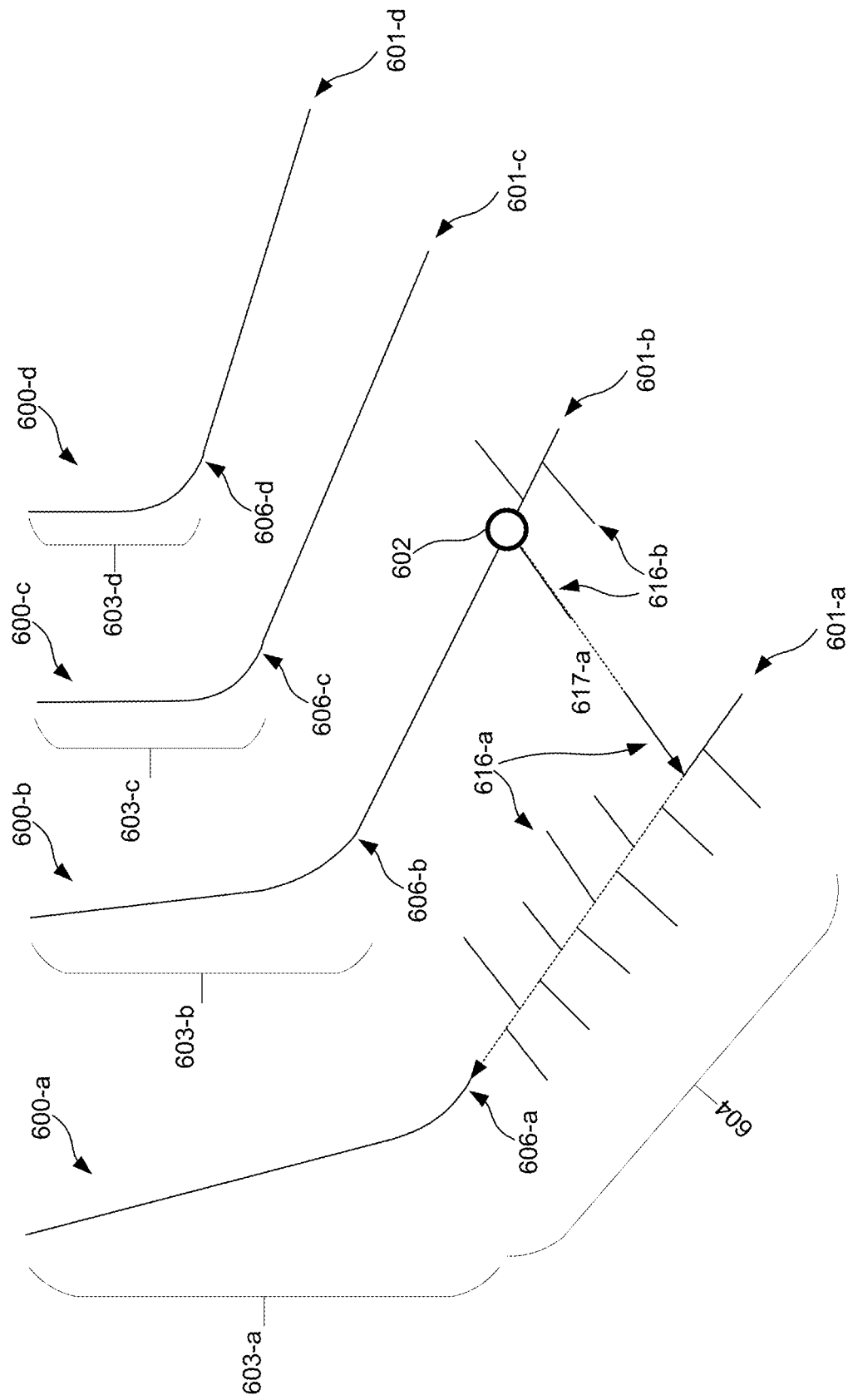
FIG. 6 illustrates an isometric view of four offset wells, each including a vertical and horizontal region separated by the heel, in accordance with one or more implementations.

FIG. 6 illustrates an isometric view of four offset wells 600 (e.g., offset wells 600-a, 600-b, 600-c, and 600-d), each including a vertical (e.g., vertical regions 603-a, 603-b, 603-c, and 603-d) and a horizontal region 604 separated by a heel 606 (e.g., heel 606-a, 606-b, 606-c, 606-d). The horizontal region 604 of each offset well 600 connects a respective heel 606 to a toe 601 (e.g., toe 601-a, toe 601-b, toe 601-c, toe 601-d). In this example, an event 602 has occurred near the toe 601-b of the second offset well 600-b. An acoustic sensor or vibration as described earlier may be coupled to a top or wellhead of the first offset well 600-a (e.g., a wellhead, circulating fluid line, or standpipe). In this case, the first offset well 600-a may be referred to as the observation well. In some cases, the acoustic sensor at the wellhead of the first offset well 600-a may detect the event 602 at the second well based on detecting sound or vibrations passing through the underground formation separating the two offset wells 600-a and 600-b. In some cases, the sound or vibrations associated with the event 602 may also pass through one or more fractures 616 (e.g., fractures 616-a, 616-b) off of one or both wells. Because pressure or sound tend to move more quickly through dense rock than through fluids in a fracture or in a well, event 602 may be detected multiple times at the acoustic sensor. In some cases, the pressure or sound measured by the acoustic sensor may be recorded in a digital format as a time series or in the time domain, also referred to as a trace, over a given time period. In some cases, the sound or vibration energy recorded may be projected back to multiple possible points of origin for the event in the underground formation. A microseismic event such as a fracture emits energy (e.g., sound or vibrations) that is detected and recorded by the acoustic sensor at the top or wellhead of well 600-a. In some cases, multiple acoustic sensors may be utilized. For instance, each well 600 may comprise an acoustic sensor at its wellhead. The microseismic data recorded at the one or more acoustic sensors may be projected back to a possible point of origin for event 602, for instance, based on applying one or more time shifts.

Figure 7:
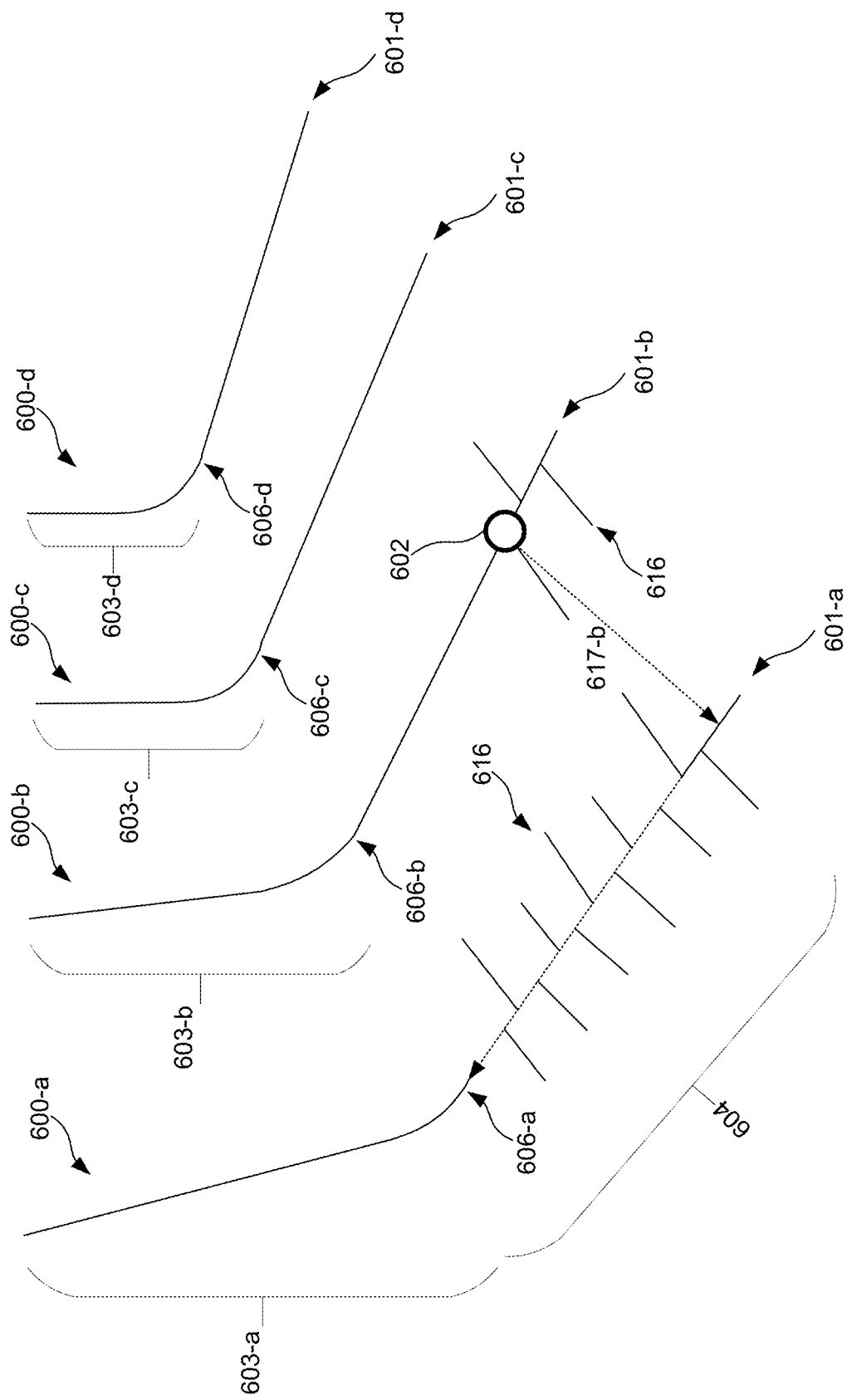
FIG. 7 illustrates an isometric view of the four offset wells in FIG. 6, in accordance with one or more implementations.
Figure 8:
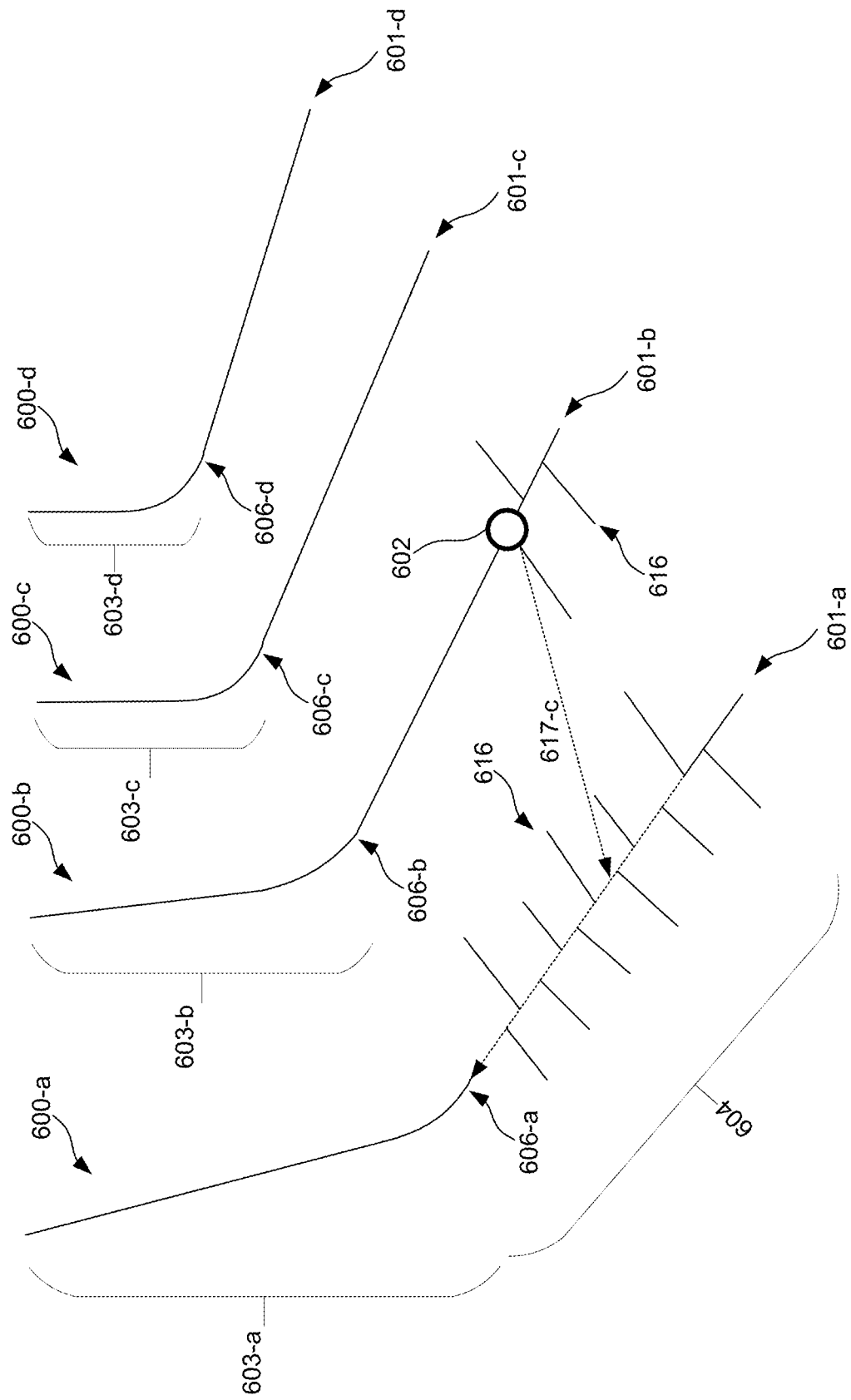
FIG. 8 illustrates an isometric view of the four offset wells in FIG. 6, in accordance with one or more implementations.
Figure 9:
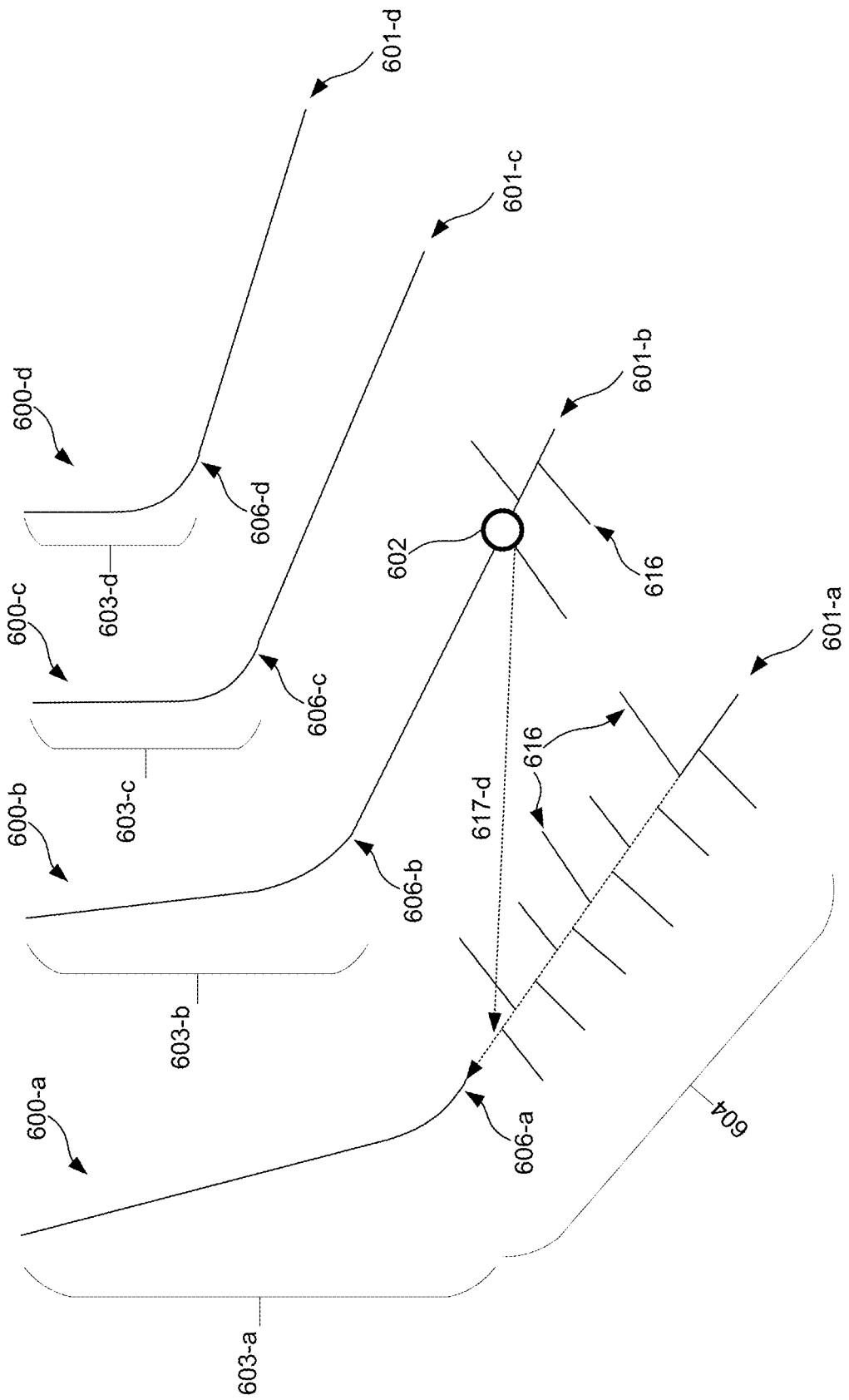
FIG. 9 illustrates an isometric view of the four offset wells in FIG. 6, in accordance with one or more implementations.
Figure 10:
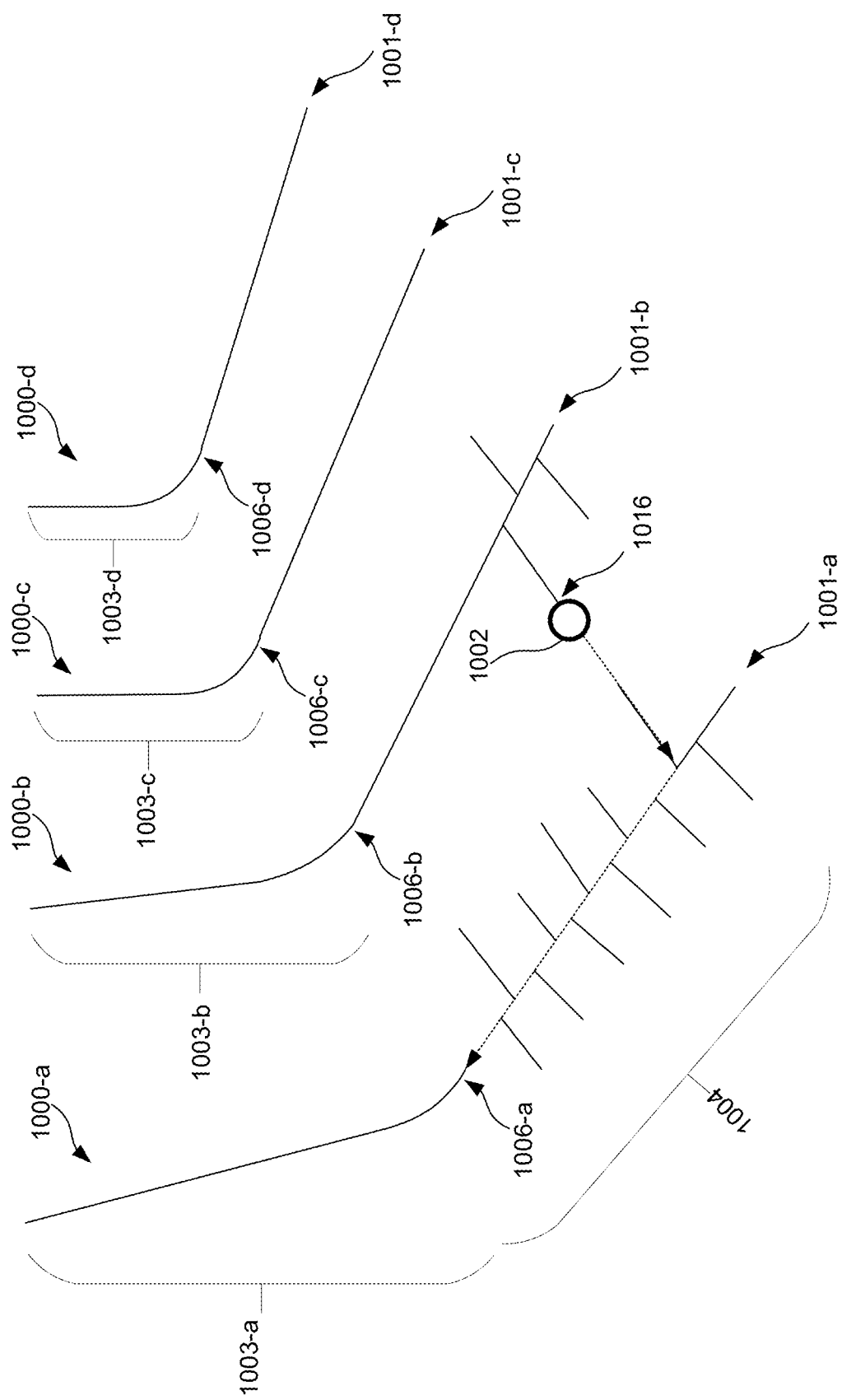
FIG. 10 illustrates an isometric view of four offset wells, each including a vertical and horizontal region separated by the heel, in accordance with one or more implementations.
Figure 11:
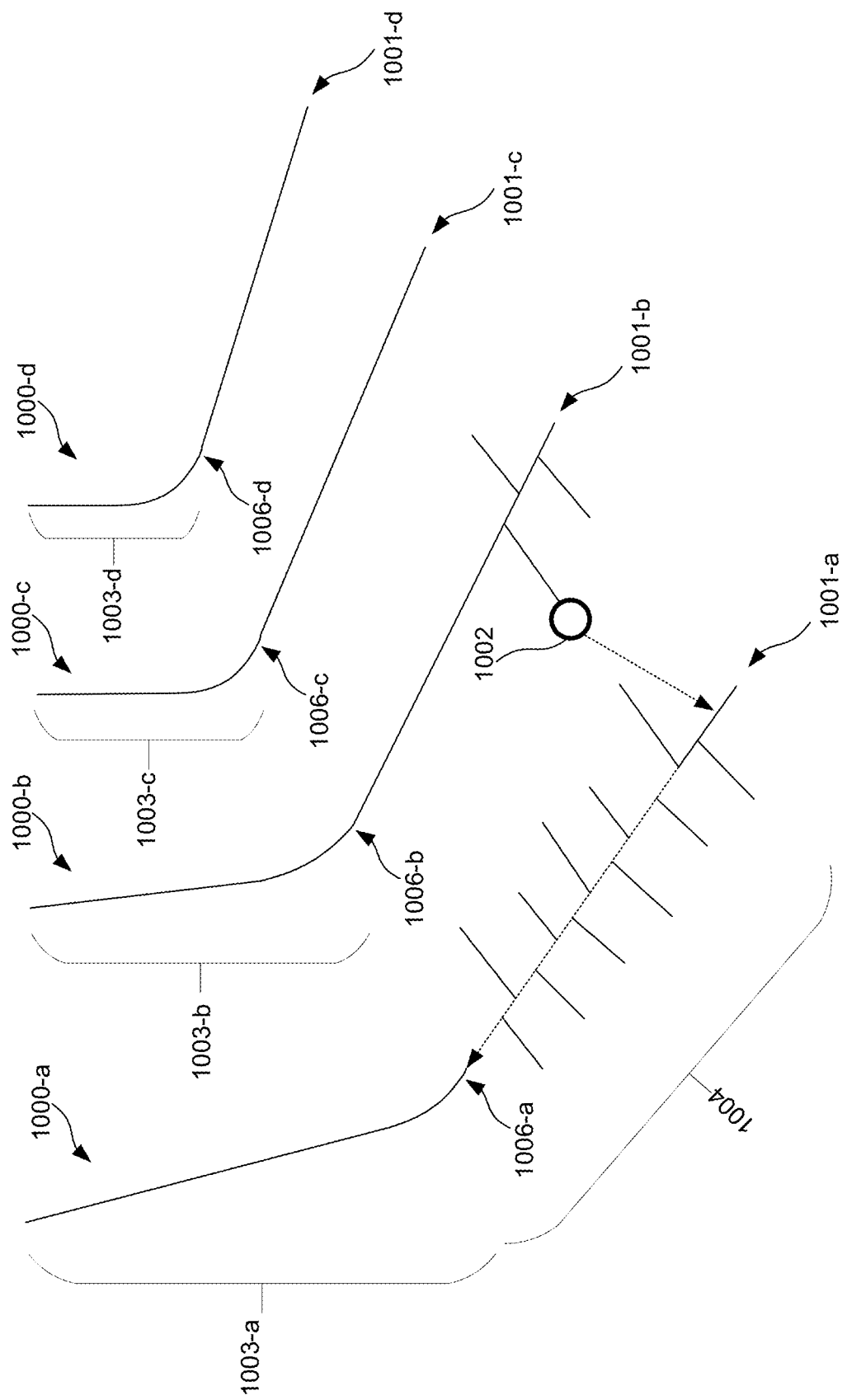
FIG. 11 illustrates an isometric view of the four offset wells in FIG. 10, in accordance with one or more implementations.
Figure 12:
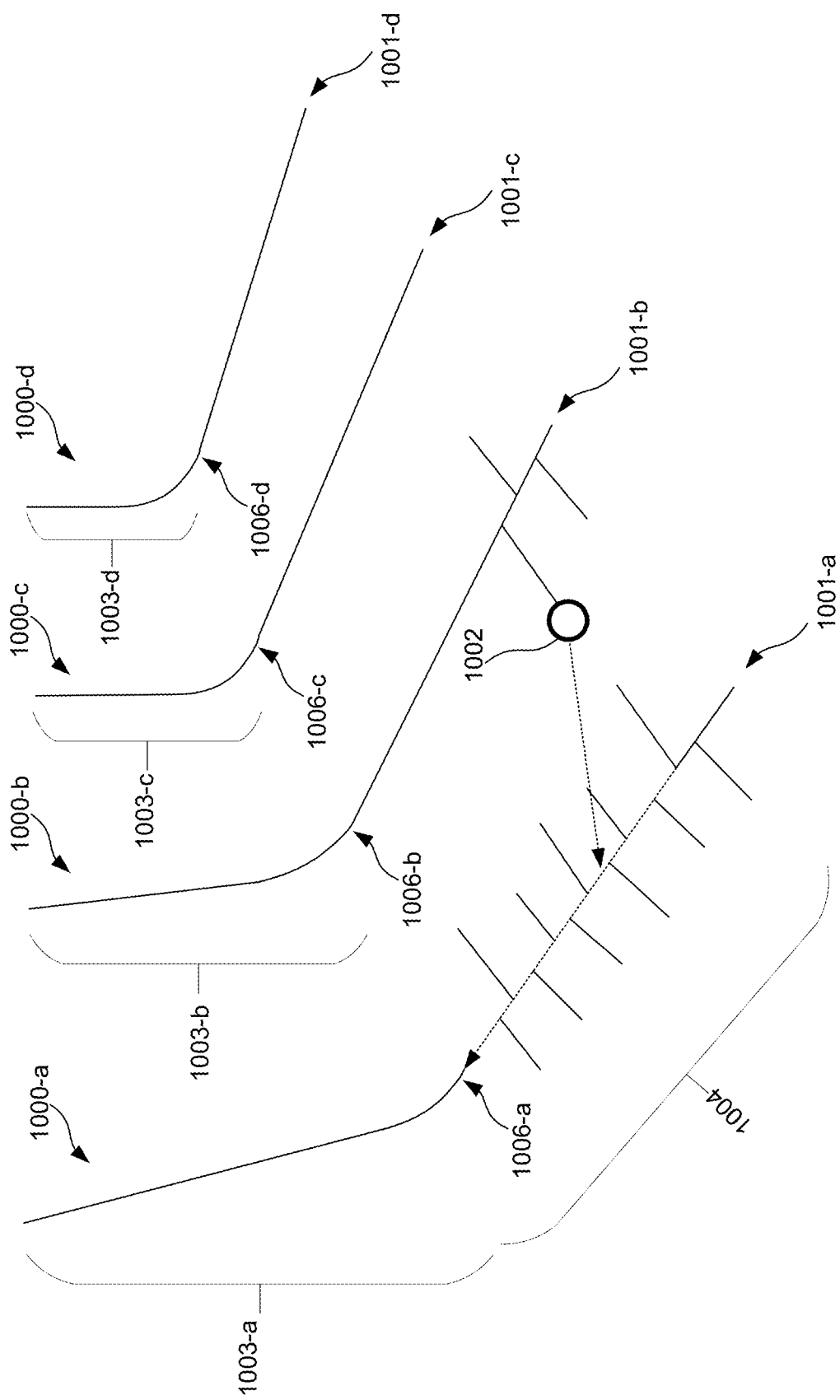
FIG. 12 illustrates an isometric view of the four offset wells in FIG. 10, in accordance with one or more implementations.
Figure 13:
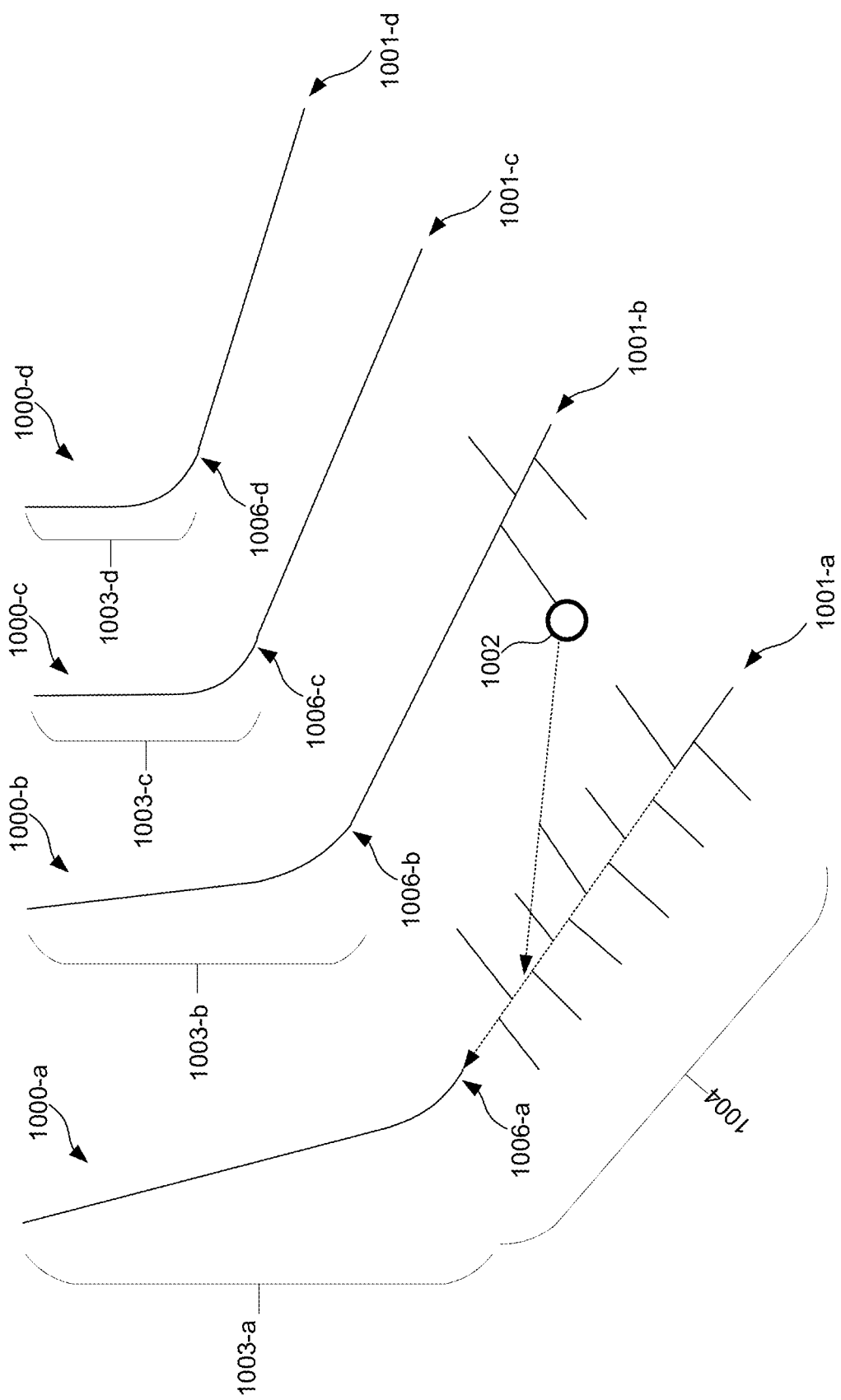
FIG. 13 illustrates an isometric view of the four offset wells in FIG. 10, in accordance with one or more implementations

FIGS. 7, 8, and 9 implement one or more aspects of the figures described herein, including at least FIG. 6. For instance, FIGS. 6-9 show example paths (i.e., path 617-a, path 617-b, path 617-c, and path 617-d) followed by the sound or vibrations from the event 602 to the heel 606-a of the first observation well 600-a. After arriving at the heel 606-a of the first observation well 600-a, the sound or vibration signals may follow the vertical wellbore (i.e., vertical region 603-a of the first observation well) and arrive at different times at the acoustic sensor of the wellhead. In particular, FIG. 6 shows sound or vibrations passing from the event 602 through fractures 616-a and 616-b of wells 600-a and 600-b, respectively, as well as a small portion of rock between those fractures. In some cases, the sound or vibrations may then travel through the horizontal region 604 of the well 600-a towards the heel 606-a. Because much of the path in FIG. 6 involves sound passing through fluids rather than solid rock, the path in FIG. 6 may be slower than the paths seen in FIGS. 7-9.

FIG. 7 shows a path slightly longer in distance than that in FIG. 6, but one where the sound or vibrations travel primarily through rock between the two wells 600-a and 600-b and then through the fluid in the well 600-a to the heel 606-a. As previously described, despite the longer distance traveled, the signal in FIG. 7 may arrive at the acoustic sensor before the signal in FIG. 6, since more of this path is through rock than the path seen in FIG. 6. FIGS. 8 and 9 show shorter paths than those seen in either of FIGS. 6 and 7. Further, the paths traveled by the sound or vibration from event 602 in FIGS. 8 and 9 may be primarily through rock. The combination of an overall shorter path length, as well as a greater path length through rock as compared to fluid, may enable the signals in FIGS. 8 and 9 to reach the acoustic sensor before the signals in either of FIGS. 6 and 7.

It should be noted that, the specifics of the FIGS. 6 through 7 are not as important as the fact that the acoustic or vibration sensor at the wellhead of the first well 600-a is likely to hear ringing, or multiple instances of the signal (or vibrations) associated with event 602, where each instance arrives at a different time. In some cases, deconvolution of the arriving signal may be used to separate each of the various signals following different paths and arriving from the event 602. In some embodiments, this ringing may be correlated with ringing from previously-monitored events. In this way, analyzing the ringing may allow a structure of the wells 600 and their fractures 616 to be assessed, assuming some knowledge about the rock formation. For instance, analysis of the ringing may provide operators with insight on a level of fracture dispersion and whether the cracks are dispersed or concentrated. Alternatively, if some understanding of the wells 600 and fractures 616 is already known, an analysis of the ringing may help determine a structure of the rock formation. In some circumstances, the rock formation may not be of a uniform density, and thus, some cracks may be softer than others. In such cases, water or other fluids flowing through the well bore may veer towards some cracks (e.g., softer cracks) over other cracks surrounded by a harder rock formation. Such a situation where water or fluids flow in an unequal manner towards different cracks based on their softness level may also be referred to as washout. In some cases, washout may be predicted by analyzing the ringing detected at the acoustic or vibration sensor at the wellhead.

FIGS. 10-13 show a similar concept as FIGS. 6-9, but for an offset well event 1002 occurring within or near an end of a fracture 1016. As shown, FIGS. 10-13 illustrate an isometric view of four offset wells 1000 (e.g., offset wells 1000-a, 1000-b, 1000-c, and 1000-d), each including a vertical (e.g., vertical regions 1003-a, 1003-b, 1003-c, and 1003-d) and a horizontal region 1004 separated by a heel 1006 (e.g., heel 1006-a, 1006-b, 1006-c, 1006-d). The horizontal region 1004 of each offset well 1000 connects a respective heel 1006 to a toe 1001 (e.g., toe 1001-a, toe 1001-b, toe 1001-c, toe 1001-d). In this example, an event 1002 has occurred within or near an end of the fracture 1016, where the fracture 1016 is located near proximal to the toe 1001-b (as opposed to the heel 1006-b) of the second offset well 1000-b. In some cases, an acoustic or vibration sensor (not shown) may be coupled to a top or wellhead of the first offset well 1000-a (e.g., at a wellhead, circulating fluid line, or standpipe). The acoustic sensor may be in direct or indirect contact with a fluid in the well or wellhead, which may measurement of acoustic in the fluid. Additionally or alternatively, a vibration sensor (not shown) may be attached to a component (e.g., metal component, such as a pipe) of the wellhead. In such cases, vibrations felt through the metal component may also be measured and recorded. Similar to FIGS. 6-9, the acoustic or vibration sensor at the well head of the observation well (i.e., first offset well 1000-a) may hear ringing, or multiple instances of the signal or vibrations associated with event 1002, since each instance may arrive at a different time based on the amount of path length through rock, fluid, etc. Analysis of this ringing and time or frequency signatures obtained from the signal data may allow a frac score to be assigned to the fracture 1016, for instance.

FIGS. 14-16 show different views of an exemplary spectral plot 1400 with four frequency spikes associated with a frac initiation in an observation well. This plot was created from actual acoustic sensor data taken over a period of time and then converted to a spectral plot via Fourier Transform. In this example, four frequencies dominate above the noise baseline and three of these spikes have relatively the same amplitude. In some cases, the amplitudes may be correlate to a size of the fracture (e.g., diameter, length, or volume). Further, these four frequencies may correspond to a formation of a fracture during one stage of a multi-stage fracturing process. While not shown, other frequencies, or other combinations of frequencies may indicate other events, such as frac initiation at an offset well, pump deployment at an offset well, etc. Furthermore, although spectral plot 1400 shows spikes for an event in an observation well (i.e., the well being monitored), in other illustrations, such spikes may represent activities in an offset well. In such cases, the events or activities may be heard or felt through intervening rock/soil between the observation and offset wells.

The spectral artifacts seen in FIGS. 14-16 are exemplary only but may be used to illustrate the analysis of any spectrum detected by the acoustic sensors. For instance, each of one or more spikes in a spectrum can be classified by intensity, amplitude, and/or stage relative perforation intensity (SRPI). There may be a separate classification for each spike, or an average of two or more spikes may be used in a classification. Each of one or more spikes may also be classified by the frac stage in which the spike occurred and/or a time that the spike occurred within a given frac stage. Each of one or more spikes may also be classified by a max or central frequency as well as a frequency width (i.e., the bandwidth or distance between high and low frequencies for a spike). In some embodiments, the spectral plot showing the frequency spikes may be used to generate a frequency signature, where the frequency signature may be associated with the event or activity. In some cases, the frequency signature may be labeled by a trained model and used to further train the model to identify similar frequency signatures associated with future events. Changes in the spectrum over time may also be associated with a frequency signature (e.g., where a frequency peak shifts at a recognizable rate).

In some embodiments, analysis of acoustic data may involve consideration of at least one model pertaining to the interaction of fluids with subterranean rock. For instance, uncoupled models can be used in cases where the stress/displacement analysis of the reservoir rock assumes that the rock is elastic. The fracture aperture can be computed from the elastic constants of the rock, in-situ stresses, and pressure distribution inside the fracture. Calculation of the fluid loss to the formation can be based on Carter's 1D diffusion solution, which predicts an instantaneous leakage inversely proportional to the square root of the wetting time. There is no direct interaction between the diffusion and deformation processes, except for a leak-off term in the mass-conservation equations of the fluid-flow analysis inside the fracture. In another example, partially coupled models can be used where the stress/displacement analysis is still based on the assumptions of elasticity. The fluid loss is calculated exactly, within the framework of the linear diffusion law, by distributing fluid sources along the fracture. The effect of pore-pressure gradient (caused by leak off) on rock deformation and therefore on fracture width may be accounted for with the concept of back stress. In yet another example, fully coupled models can be implemented that include the full range of coupled diffusion/deformation effects predicted by Biot's theory of poroelasticity: sensitivity of the volumetric response of the rock to the rate of loading, pore-pressure change induced by the variation of mean stress, and back-stress effects already accounted for in the partially coupled models. The fully coupled model may assist in assessing fracture quality.

In general, AI models aim to learn a function (f(X)) which provides the most precise correlation between input values (X) and output values (Y), such that Y=f(X). The artificial intelligence (AI) models described throughout this disclosure may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks.

In some embodiments, a plurality of distinct machine-learning algorithms may operate in parallel, which may serve to enhance the accuracy of predicting future wireline sticking or jamming events, or for assigning frac scores, further described below. In some aspects, the use of multiple machine-learning algorithms may also decrease false positive indications as compared to the use of a single machine learning algorithm. In some cases, a combination of three or four machine learning algorithms may operate in parallel, which may provide a balance of high accuracy versus system complexity. Some non-limiting examples of machine learning algorithms may include a neural network, a decision tree, a support vector machine, and Bayesian methods Frac Score This disclosure now turns to using the acquisition and analysis of high frequency acoustic or vibration data and converting it to the frequency domain to provide real-time quantitative feedback on fracking operations (such as, but not limited to, fracture formation, number, and quality). Whereas traditional subterranean analysis, such as microseismic monitoring, takes in massive amounts of data, and uses slow off-site computation in server farms, high frequency acoustic or vibration data can provide greater insights with less data processing by using one sensor per well. Further, since the processing requirements are significantly lower as compared to traditional techniques, feedback may be in real-time (or close to real time), and processing may be performed on less expensive, less computationally powerful, on-site computers. In some embodiments, a single acoustic or vibration sensor may be used to provide both position and quality information about cracks. In some cases, one or more of the following parameters may be determined for a given crack or a set of cracks: (1) connection to the well; (2) connection to another crack; (3) diameter; (4) length; (5) whether the crack has been propped; (6) quality and/or volume of fluid flow within the crack; (7) number; (8) location and/or depth; (9) cross-section; and (10) volume.

In some embodiments, one or more of these parameters may be assigned a score. Further, each fracture may be assigned a total score, for instance, a sum of one or more scores for the above parameters. In some cases, each parameter may be weighted equally. In some other cases, each of these parameters may be weighted differently, and a total score for a fracture may correspond to a sum of weighted scores (e.g., weight of parameter x score for parameter) for the different parameters. Results of a fracking operation or a tweak to a previous operation can then be assigned a score in real-time, providing valuable quantitative feedback that can be used to improve future operations. For instance, current frac stage time, which is typically around 2-3 hours, is largely based on operator intuition (i.e., guesses and gut feelings). Via the herein disclosed "frac scores", operators can begin to see frac scores associated with different lengths of time for stages or whether changing the pH of the well or providing other additives to a stage, etc., may enhance fracking performance as another example, frac scores can be assigned based on use of different pressures in a given stage or even varying pressure at different times (e.g., gradually increasing pressure during stage evolution may lead to a higher frac score than a constant pressure throughout the stage). This disclosure contemplates using frac scores relative to these and many other fracking parameters. In some cases, micro-fracture testing (as previously described in relation to FIG. 5) may also be performed to estimate initial frac scores. Since micro-fracture testing is substantially less invasive and less intensive than traditional fracturing, the frac score estimated from micro-fracture testing may be used to determine the viability of the well for oil production before traditional fracturing even begins.

In an embodiment, individual cracks can be identified in the frequency domain of the acoustic/vibration data and scores can be assigned to individual cracks. In some cases, the acoustic/vibration signal data may comprise a plurality of frequency domain features, where the frequency domain features are indicative of the acoustic or vibration signal across a frequency spectrum. By comparing the plurality of frequency domain features with one or more known frac dispersion signatures, a level of frac dispersion (i.e., are cracks disperses or concentrated) may also be obtained. As previously noted, a frequency domain representation of the time domain data may be using a Fourier Transform, for instance. In some embodiments, a Short Time Fourier Transform (STFT) technique, a Discrete Fourier Transform (DFT) technique, or a Fast Fourier Transform (FFT) algorithm may be used for the Fourier analysis. As one non-limiting example, a crack can receive a score depending on whether it connects to the well bore and whether it is wide enough to be propped (or whether it is propped). In another embodiment, acoustic or vibration signals in the time domain from multiple cracks are indistinguishable, but sets or groups of cracks can be distinguished in the frequency domain in this case, a score can be assigned to a set or group of cracks. For instance, the set or group of cracks can receive a score depending on whether the set or group is on average connected to the well bore and whether the set or group is on average wide enough to be propped (or whether it is propped). In another embodiment, where even less resolution is possible, a score can be assigned to all cracks formed around a given well during a period of time. For instance, the set or group of cracks formed in the period of time can receive a score depending on whether the average crack (or majority of cracks) is (are) connected to the well bore and whether the average crack (or majority of cracks) is (are) wide enough to be propped (or whether it is propped).

In an embodiment, horizontal shifting and other types of subterranean movement can be categorized separately from fractures since they do little to increase hydrocarbon production. For instance, a fracture may be assigned values of 2 or greater, whereas horizontal shifting events may be assigned a value of 1. Micro seismic or static pressure data alone in contrast, would be unable to distinguish a very large fracture or series of fractures from horizontal shifting.

Figure 17:
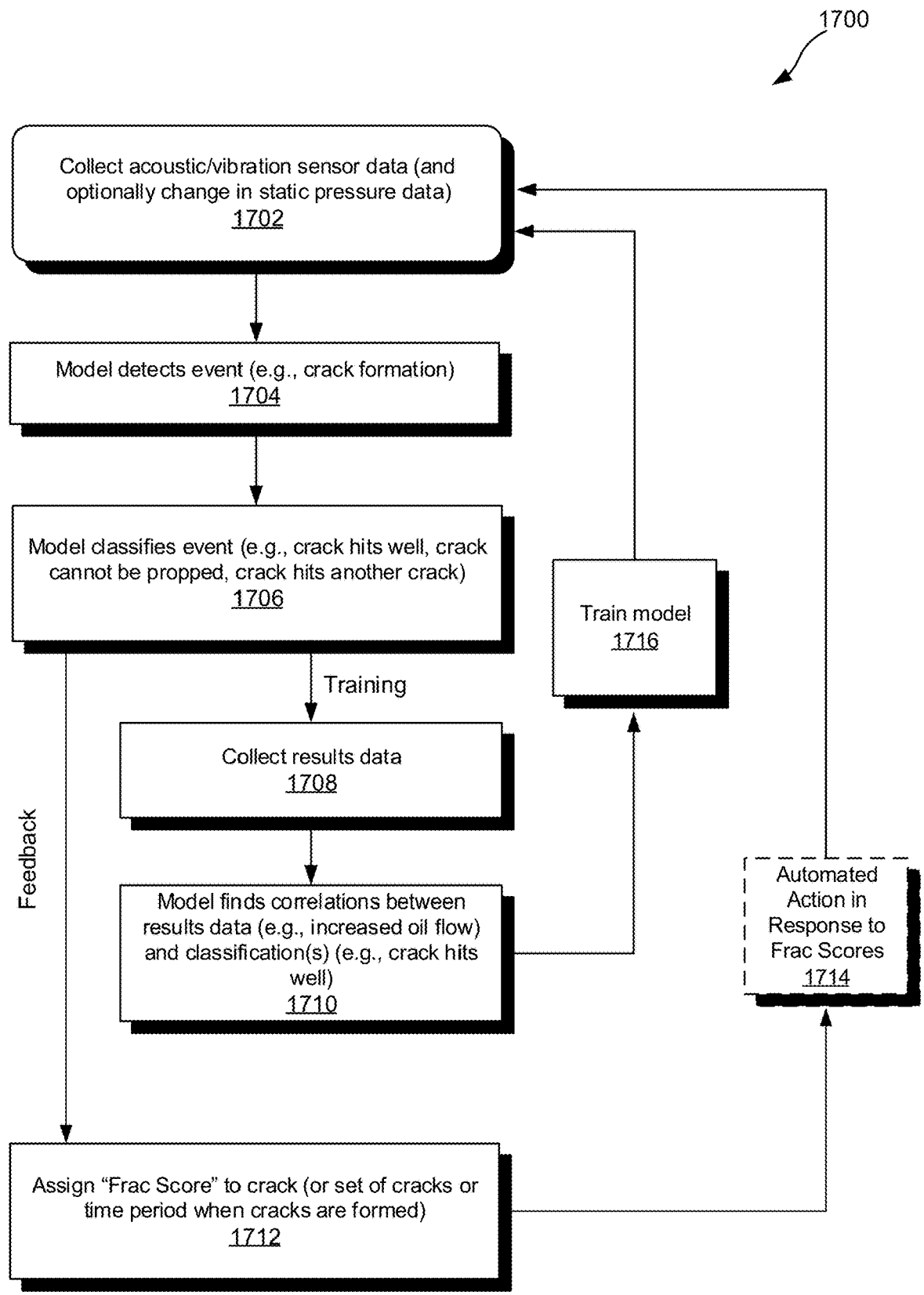
FIG. 17 shows an embodiment of a method for quantifying fracking operations, and optionally controlling fracking operations through quantitative feedback, according to an embodiment of the disclosure.

FIG. 17 shows an embodiment of a method for quantifying fracking operations, and optionally controlling fracking operations through quantitative feedback. The method 1700 will be described in association with components of the system 1800 shown in FIG. 18 and the system 1900 shown in FIG. 19. The method 1700 can include collecting high frequency acoustic or vibration data at an acoustic sensor (Block 1702), for instance, via one or more acoustic or vibration sensors 1808 and/or 1913. Optionally, the method 1700 may also involve monitoring and recording static pressure readings and/or changes in static pressure (Block 1702). In some embodiments, conversion to a frequency spectrum may be performed via an optional spectrum analyzer 1910 or other device for converting data from the time domain to the frequency domain (e.g., the optional acoustic/vibration data converting module 1814). In some cases, conversion may involve performing a FFT on the time domain data to generate frequency domain data. In some examples, the data from the acoustic or vibration sensor may be fed into a model for identifying spectral aspects of the data that may match (or resemble) known acoustic or vibration behavior of an event (Block 1704). For instance, the spectrum analyzer 1910 may pass frequency spectrum data to the machine learning component 1912 where the frac score module 1924 can, in concert with the model 1914, detect a frequency signature deserving further analysis. Additionally or alternatively, the data comparing module 1816 may also be used to perform this detection. For instance, background noise may be associated with a rounded peak around 1 kHz. In one non-limiting example, amplitude spikes observed at around 5 and/or 10 kHz may be identified as events for comparing to known signatures in the model. In other words, the model may been previously trained to recognize a spectral signal associated with certain fracking events or crack types or crack parameters. Besides analyzing and assessing frequency spectrum data, the model may optionally be used to analyze changes in static pressure taken by the acoustic or vibration sensor (e.g., see FIG. 17), or by a second sensor that tracks pressure rather than acoustic or vibration data.

In some examples, the model may then classify the fracking event (Block 1706), for instance, by matching the sensor data with one or more categories of events. For instance, the model and/or a label assignment module 1818 may match the acquired sensor data with a category of crack sizes or crack lengths. In one example, a 5 kHz spike in the frequency domain may be associated with a formation of cracks, while a 10 kHz spike may generally be associated with an intersection of a crack and the main well. In this case, the label assignment module 1818 may match the acquired sensor data with these known frequency spikes. Additionally, in some embodiments, there maybe smaller additional frequency spikes that the model has associated with fluid flow dynamics such as laminar versus turbulent flows. Thus, the event data can be compared to known frequency spectrum signatures for small crack formation, large crack formation, short crack formation, long crack formation, turbulent fluid flow in a crack, laminar fluid flow in a crack, crack formation that intersects the well, crack formation that does not intersect the well, and horizontal shifting, to name a few non-limiting examples. In some embodiments, existing categories or classifications may be stored in the model 1914.

As part of the feedback track of the method 1700, a frac score may be assigned based on the classification (Block 1712). Further, the method 1700 may include returning to Block 1702 for collection of more data. Optionally, the method 1700 may include automating fracking operations (e.g., increasing fluid pressure or increasing well spacing as two non-limiting examples) in response to the frac score (Block 1714 in dashed lines implies that it is optional). Details of frac score assignment are noted later in this disclosure.

After the model classifies events (Block 1706), the method 1700 may include collecting results data (i.e., as part of the model training track of the method 1700), where the results data may be associated with the event (Block 1708). It should be noted that, the training and feedback tracks may operate serially, or in parallel, based on use case. In some other cases, the training and feedback tracks may be alternatives. In some cases, results data may include any data type or information produced as a consequence of the event classified in Block 1706. For instance, results data could relate to increased oil flow in the well, during production, or following formation of one or more cracks during fracking. In some other cases, results data may relate to a decrease in fracking fluid pressure following formation of a crack, to name another non-limiting example. In some embodiments, results data may be obtained from external resources 1834 such as a flow meter measuring oil/gas volume during production. As another example, in FIG. 19, the controller 1918 or another sensor may provide oil and/or gas flow data to the frac score module 1924. In such cases, the model (e.g., 1914) may then analyze the data to determine correlations (if any) between the results data and the classified event data (Block 1710). In some cases, the data comparing module 1816 and/or the frac score module 1924 may be configured to determine said correlations. In some cases, multiple sets of results data may be correlated to a single classified event. For instance, the method 1700 may be used to determine that frequency signatures classified as large crack formation may correlate to increased oil flow, whereas frequency signatures classified as small crack formation may correlate to steady oil flow. In some cases, these correlations may be used to train the model, following which the method 1700 may restart. In some cases, one or more of the frac score module 1824 and/or the training module 1830 may be used to train the model 1914 (Block 1716).

In some cases, the method 1700 may include determining that an original classification or labeling of a data signature is inaccurate. In some cases, this lack of correlation may also be used to train the model (alternate functionality of Block 1710). For instance, a frequency signature may appear similar to previous instances of crack formations intersecting a well and may be classified as such at Block 1706. However, the results data from this event may indicate low oil flow, which may suggest that the crack may not have intersected the well (Block 1710). In this example, this inaccurate classification may indicate that the model is focusing on improper aspects of the frequency spectrum while trying to classify cracks that intersect the main well. In some instances, this recognition may be used to train the model to focus on other aspects of the frequency signature. For example, the model may have initially focused on three frequency spikes to characterize intersection of a crack with the well bore. However, after erroneously classifying one or more cracks as "large" that did not result in increased oil production, the model may proceed to drop one of these three spikes (e.g., the crack characterized as large) in its analysis and focus on the other two to more accurately characterize the size of cracks. Either way, one or more sets of data collected on an event, along with resulting classifications or labels, as well as correlations found, if any, based on results data, may be used alone or in any combination to train the model (Block 1716).

As noted earlier, once a label or classification is assigned to a frequency signature (Block 1706), the method 1700 may include assigning frac scores (Block 1712). In some cases, a frac score assignment module 1819 may be configured to assign frac scores, where the frac scores may be assigned to individual cracks, sets of cracks, or at least a portion of cracks formed during a period of time. In some examples, frac scores may indicate a likelihood that a crack or set of cracks will enhance production. For instance, in some embodiments, large cracks that can be propped and connect to the well bore may be assigned the highest frac scores. Over a period of time (e.g., during which a stage is fracked), frac scores can be added up to provide a quantitative assessment of the effectiveness of a set of fracking operations (e.g., a frac score can be assigned to a stage). For instance, operators can compare frac scores for stages that are pumped for two hours versus those pumped for three hours. In some cases, indication generating module 1820 may be used to present frac scores to operators, for instance, via an operator display 1916. In some cases, an operator may input manual changes to operations in response to different frac scores, where the manual changes may be relayed to the controller 1918. Optionally, in parallel to presenting frac score to the display 1916, or alternatively, automated control of the controller 1918 can be performed (optional Block 1714). In some cases, the feedback/control module 1822 may be configured to automatically control fracking operations, for instance, via the controller 1918. In some instances, an algorithm may be used in conjunction with the feedback/control module 1822 and/or the controller 1918 to operate different stages of the fracking operation with different parameters. In such cases, the algorithm may analyze the resulting frac scores and adjust future frac stage parameters to optimize production. In some aspects, the algorithm may be used to determine optimal frac stage parameter values, for instance, to maximize the resulting frac scores. In some other cases, one or more downhole parameters may be controlled based on the resulting frac scores, the downhole parameters selected from a group consisting of perf gun firing, start and end of pumping down perf guns, start and end of pumping down plugs, and pressurizing to create fractures, to name a few examples.

Figure 18:
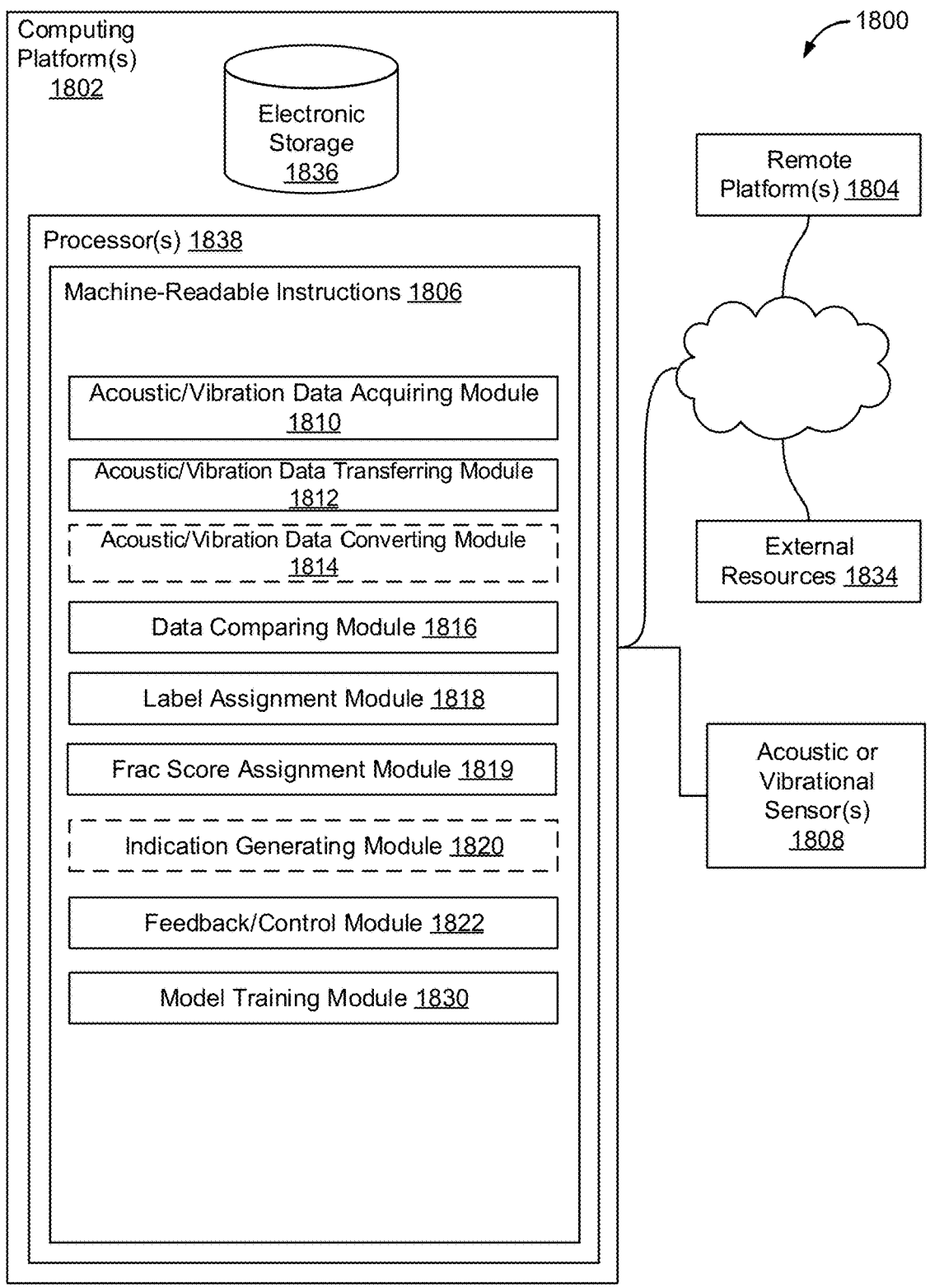
FIG. 18 illustrates a computing system configured for quantifying fracking operations, and optionally controlling fracking operations through quantitative feedback, in accordance with one or more implementations.

In FIG. 18, the order of the blocks within the machine-readable instructions 1806 is non-limiting. For instance, the model training module 1830 can operate to train the model either before, after, or in parallel to operation of frac score assignment module 1819, indication generating module 1820, and/or feedback/control module 1822.

Figure 19:
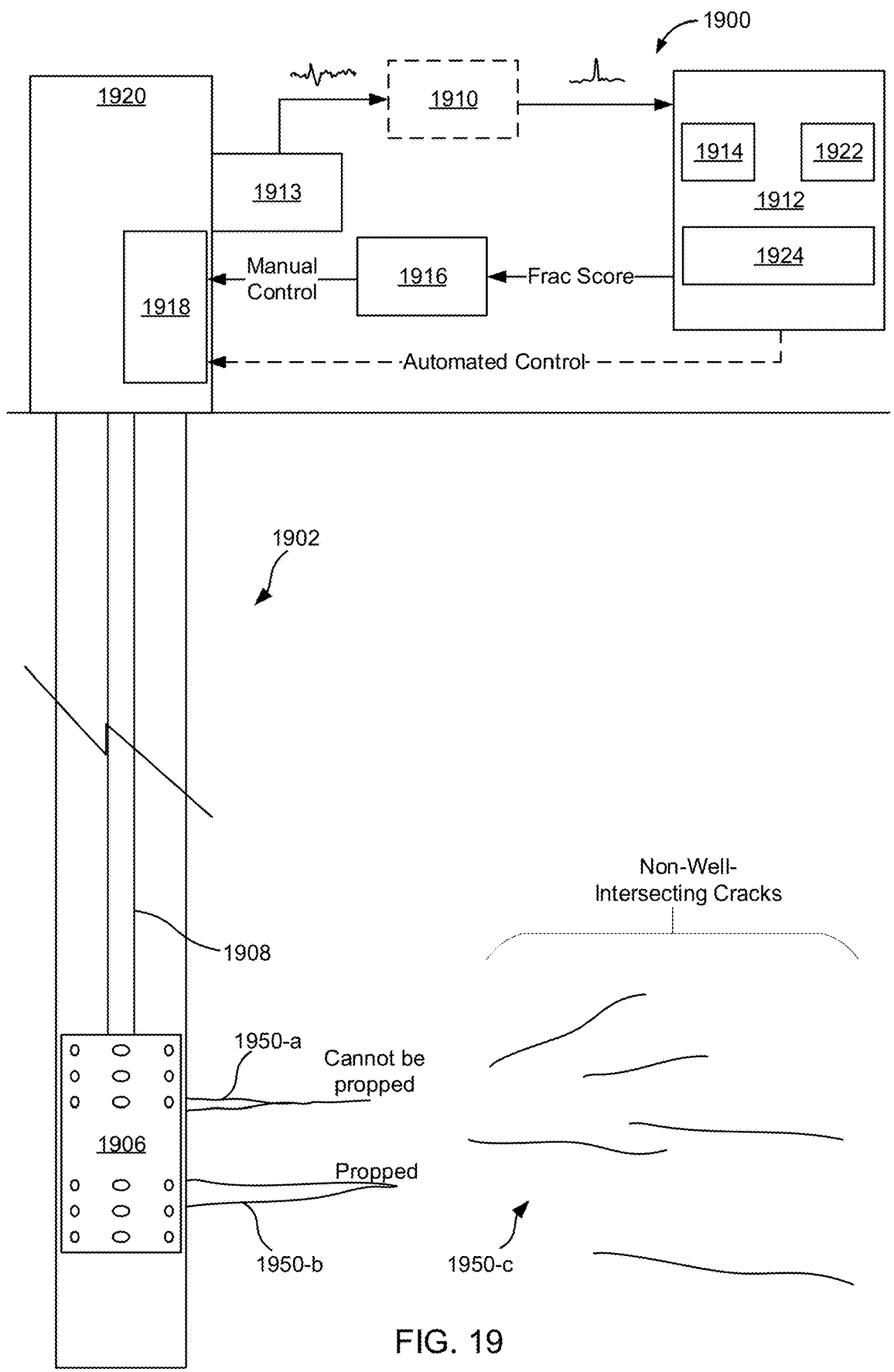
FIG. 19 illustrates an exemplary well including an acoustic or vibration sensor at the wellhead according to an embodiment of the disclosure.

The following provides a more detailed description of the system 1800 shown in FIG. 18, where FIG. 18 illustrates a more detailed embodiment of some example components that may be used to carry out the method shown in FIG. 17 and/or to underly the components shown in FIG. 19. Specifically, FIG. 18 illustrates a system 1800 configured for quantifying fracking operations, and optionally controlling fracking operations through quantitative feedback, in accordance with one or more implementations. In some implementations, system 1800 may include one or more computing platforms 1802. Computing platform(s) 1802 may be configured to communicate with one or more remote platforms 1804 according to a client/server architecture, a peer-to-peer architecture, and/or other architectures. Remote platform(s) 1804 may be configured to communicate with other remote platforms via computing platform(s) 1802 and/or according to a client/server architecture, a peer-to-peer architecture, and/or other architectures. Users or operators may access system 1800 via remote platform(s) 1804.

Computing platform(s) 1802 may be configured by machine-readable instructions 1806. Machine-readable instructions 1806 may include one or more instruction modules. The instruction modules may include computer program modules. The instruction modules may include one or more of acoustic or vibration data acquiring module 1810, acoustic or vibration data transferring module 1812, acoustic or vibration data converting module 1814 (optional), data comparing module 1816, label assignment module 1818, frac score assignment module 1819, indication generating module 1820 (optional), feedback/control module 1822, and/or model training module 1830, to name a few non-limiting examples.

Acoustic or vibration sensor(s) 1808, previously described above, may be in communication with the computing platform(s) 1802 and may be configured to provide raw data to the processor(s) 1838. In some embodiments, the acoustic or vibration sensor(s) 1808 may be adapted for direct physical contact with fluid within a well (or alternatively, for direct physical contact with a component of the well such as a pipe). In some examples, the sensor(s) 1808 may be high frequency sensors, for instance, designed for >1000 sample/second rate. In an embodiment, the acoustic or vibration sensor 1808 may include a piezoelectric material configured to generate a current or voltage proportional to an amplitude of vibration of the piezoelectric material. Some non-limiting examples of piezoelectric materials may include lead zirconate titanate (PZT), barium titanate, lead titanate, Rochelle salt, ammonium dihydrogen phosphate, lithium sulphate, quartz, topaz, zinc oxide, etc.

In some examples, acoustic or vibration data acquiring module 1810 may be configured to acquire acoustic or vibration data in a time domain from the sensor(s) 1808.

In some examples, acoustic vibration data transferring module 1812 may be configured to transfer the acoustic or vibration data to a spectrum analyzer (e.g., spectrum analyzer 1910) or any another device capable of transforming data from the time domain to the frequency domain it should be noted that, the spectrum analyzer may or may not be part of the same computing platform that various other modules in FIG. 18 are a part of. For instance, the spectrum analyzer may be separate from a computing platform where comparisons of frequency signatures to the model occur. In some embodiments, acoustic or vibration data converting module 1814 may be configured to convert the acoustic or vibration data from the time domain to a frequency domain via the spectrum analyzer or another applicable device.

Data comparing module 1816 may be configured to compare the acoustic or vibration data in the frequency domain to a model trained on frequency signatures, where the frequency signatures correspond to known crack types or qualities (e.g., connected to well, able to be propped, etc.). In some examples, the model may be trained to recognize frequency signatures corresponding to certain fracking fluid flow patterns. By way of non-limiting example, the comparing may comprise consideration of a number of frequency spikes, a width of the frequency spikes, and/or an amplitude of the frequency spikes pertaining to the frequency signatures, among other aspects of the frequency spectrum. Fracture initiation may be identified by the frequency peak with the greatest amplitude.

Label assignment module 1818 may be configured to assign one of a plurality of labels to the acoustic or vibration data in the frequency domain based on the comparing. By way of non-limiting example, the plurality of labels may include: connected to the well, connected to another crack, diameter of the crack, length of the crack, and whether the crack has been propped. In some cases, the plurality of labels may be associated with binary values (i.e., 1 or 0, True or False, Yes or No), for instance, connected to the well or to another crack. Alternatively, the labels may be associated with numerical or alpha-numerical values, where a corresponding unit (e.g., mm, cm, ft) may be implied or explicitly stated. For instance, for the label "diameter of the crack" or "length of the crack", the label assignment module 1818 may assign a label of "4" if a unit (e.g., cm) is inherently implied. Alternatively, the label assignment module 1818 may assign a label of "4 cm" if the unit needs to be explicitly stated.

Indication generating module 1820 may be configured to send a frac score to the operator display (e.g., operator display 1916), thereby helping the operator to gauge the effectiveness of certain fracking parameters such as stage length and fracking pressure. The indication generating module 1820 is optional since an automated process of using the frac scores may alternatively be used to fracking operations without sending an indication to the operator display. Alternatively, even where automated adjustments are made, indications may still be sent to the operator display alerting the operator as to frac scores and what automatic adjustments are being made.

In some cases, feedback/control module 1822 may be configured to instruct a controller (e.g., controller 1918) to make adjustments to current or future fracking operations, for instance, in response to analysis of frac scores. In one example, a frac score module (also shown as frac score module 1924 in FIG. 19) may determine that 2-hour stage lengths may be just as effective as 3-hour stage lengths, with the advantage of a shorter stage length duration. In this case, the feedback/control module 1822 may instruct the controller to begin using 2-hour stage lengths, for example.

In some embodiments, model training module 1830 may be configured to train the model (also shown as model 1914 in FIG. 19) for recognizing acoustic or vibration data in the frequency domain using one or more of the plurality of labels or classifications.

In some implementations, computing platform(s) 1802, remote platform(s) 1804, and/or external resources 1834 may be operatively linked via one or more electronic communication links for example, such electronic communication links may be established, at least in part, via a network such as the Internet and/or other networks. It will be appreciated that this is not intended to be limiting, and that the scope of this disclosure includes implementations in which computing platform(s) 1802, remote platform(s) 1804, and/or external resources 1834 may be operatively linked via some other communication media.

A given remote platform 1804 may include one or more processors configured to execute computer program modules. The computer program modules may be configured to enable an operator or user associated with the given remote platform 1804 to interface with system 1800 and/or external resources 1834, and/or provide other functionality attributed herein to remote platform(s) 1804. By way of non-limiting examples, a given remote platform 1804 and/or a given computing platform 1802 may include one or more of a server, a desktop computer, a laptop computer, a handheld computer, a tablet computing platform, a NetBook, a Smartphone, a gaming console, and/or other computing platforms.

External resources 1834 may include sources of information outside of system 1800, external entities participating with system 1800, and/or other resources. For instance, external data may be fed into the model to help with initial training in some implementations, some or all of the functionality attributed herein to external resources 1834 may be provided by resources included in system 1800. One non-limiting example of an external resource is results data, such as oil/gas flow volume that maybe measured by one or more sensors other than the acoustic or vibration sensor 1913.

Computing platform(s) 1802 may include electronic storage 1836, one or more processors 1838, and/or other components. Computing platform(s) 1802 may include communication lines, or ports to enable the exchange of information with a network and/or other computing platforms. Illustration of computing platform(s) 1802 in FIG. 18 is not intended to be limiting. Computing platform(s) 1802 may include a plurality of hardware, software, and/or firmware components operating together to provide the functionality attributed herein to computing platform(s) 1802. For example, computing platform(s) 1802 may be implemented by a cloud of computing platforms operating together as computing platform(s) 1802. In an embodiment, the computing platform 1802 including the processor(s) 1838 may reside on the premises of the fracking operation, for instance, on the same pad as the well(s) being monitored/controlled.

Electronic storage 1836 may comprise non-transitory storage media that electronically stores information. The electronic storage media of electronic storage 1836 may include one or both of system storage that is provided integrally (i.e., substantially non-removable) with computing platform(s) 1802 and/or removable storage that is removably connectable to computing platform(s) 1802 via, for example, a port (e.g., a USB port, a firewire port, etc.) or a drive (e.g., a disk drive, etc.). Electronic storage 1836 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1836 may include one or more virtual storage resources (e.g., cloud storage, a virtual private network, and/or other virtual storage resources). Electronic storage 1836 may store software algorithms, information determined by processor(s) 1838, information received from computing platform(s) 1802, information received from remote platform(s) 1804, and/or other information that enables computing platform(s) 1802 to function as described herein.

Processor(s) 1838 may be configured to provide information processing capabilities in computing platform(s) 1802. As such, processor(s) 1838 may include one or more of a digital processor, an analog processor, a digital circuit designed to process information, an analog circuit designed to process information, a state machine, and/or other mechanisms for electronically processing information. Although processor(s) 1838 is shown in FIG. 18 as a single entity, this is for illustrative purposes only. In some implementations, processor(s) 1838 may include a plurality of processing units. These processing units may be physically located within the same device, or processor(s) 1838 may represent processing functionality of a plurality of devices operating in coordination. Processor(s) 1838 may be configured to execute modules 1810, 1812, 1814, 1816, 1818, 1819, 1820, 1822, 1830, and/or other modules.

Processor(s) 1838 may be configured to execute modules 1810, 1812, 1814, 1816, 1818, 1819, 1820, 1822, 1830, and/or other modules by software; hardware; firmware; some combination of software, hardware, and/or firmware; and/or other mechanisms for configuring processing capabilities on processor(s) 1838. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1810, 1812, 1814, 1816, 1818, 1819, 1820, 1822, and/or 1830 are illustrated in FIG. 18 as being implemented within a single processing unit, in implementations in which processor(s) 1838 includes multiple processing units, one or more of modules 1810, 1812, 1814, 1816, 1818, 1819, 1820, 1822, and/or 1830 may be implemented remotely from the other modules. The description of the functionality provided by the different modules 1810, 1812, 1814, 1816, 1818, 1819, 1820, 1822, and/or 1830 described herein is for illustrative purposes, and is not intended to be limiting, as any of modules 1810, 1812, 1814, 1816, 1818, 1819, 1820, 1822, and/or 1830 may provide more or less functionality than is described. For example, one or more of modules 1810, 1812, 1814, 1816, 1818, 1819, 1820, 1822, and/or 1830 may be eliminated, and some or all of its functionality may be provided by other ones of modules 1810, 1812, 1814, 1816, 1818, 1819, 1820, 1822, and/or 1830. As another example, processor(s) 1838 may be configured to execute one or more additional modules that may perform some or all of the functionality attributed below to one of modules 1810, 1812, 1814, 1816, 1818, 1819, 1820, 1822, and/or 1830.

FIG. 19 illustrates a drilling system 1900 comprising an exemplary well 1902. In some examples, the well 1902 may comprise a wellhead 1920 (or circulating fluid line or standpipe) and an acoustic or vibration sensor 1913 at the wellhead 1920, where the acoustic or vibration sensor 1913 is in direct physical contact with fluid in the well. In some cases, the drilling system 1900 may further comprise a perforation gun 1906 deployed at a stage in the well 1902. In some cases, one or more cracks having varying characteristics may be created due to ongoing fracking. For instance, and as illustrated in FIG. 19, a number of cracks may be created, including a crack 1950-$a$ that intersects the well 1902 but is too narrow to be propped, another crack 1950-$b$ that intersects the well 1902 and is large enough to be propped, and one or more cracks 1950-$c$ that do not intersect the well 1902. Although the perforation gun 1906 is illustrated in a vertical section of well, it should be noted that, in other embodiments, the perforation gun 1906 may be located in a horizontal or roughly horizontal section of the well 1902 (e.g., horizontal region 604 in FIG. 6).

The acoustic or vibration sensor 1913 may provide raw data (e.g., in a time domain) to an optional converter 1910 arranged on-site (or optionally at a location remote from the well pad). A spectrum analyzer is one non-limiting example of the converter 1910. In some embodiments, the converter 1910 may be configured to convert the raw time series data to a frequency domain A machine learning system 1912, including a model 1914, a frac score database 1922, and a frac score module 1924, may be configured to search for and identify frequency signatures in the frequency domain of the data. In some embodiments, the model 1914 may be stored in electronic storage such as electronic storage 1836. In some cases, the machine learning system 1912 may be configured to search for and identify time signatures in the raw data, without the use of the converter 1910. In some circumstances, even though conversion from time domain to frequency domain may not be performed for analysis or training the model, conversion may be performed prior to display on the operator's computer, since frequency domain representation may be more intuitive or easier to understand for a human.

In some cases, the identified frequency signatures may be associated with known frequency signatures for different fracking events and parameters, including, but not limited to, crack parameters. For instance, water and proppant passing through smaller cracks, such as crack 1950-*a*, may generate higher frequency data and/or vibrations than larger cracks, such as crack 1950-*b*. As previously described, screenout may refer to a condition encountered during gravel-pack operations whereby a treatment area cannot accept further pack sand. In some cases, there may be a sudden increase in treatment pressure when screenout occurs. Under ideal conditions, screenout generally signifies that the entire void area has been successfully packed with sand. However, if screenout occurs too early in the treatment, it may indicate an incomplete treatment and the presence of undesirable voids within the pack zone. In some cases, aspects of the present disclosure may relate to predicting screenout based on identifying one or more unique signatures associated with the same. Furthermore, by using a combination of raw time domain data and frequency spectra, early screenout may be identified. In some other cases, a void area successfully packed with sand may be distinguishable from a pack zone comprising undesirable voids, for instance, based on their frequency signatures. As described in relation to FIGS. 6-13, pressure or sound waves may travel at different speeds through dense rock, sand, air, fluids in a fracture or well, etc. A void area successfully packed with sand may comprise a higher ratio of sand to air than a pack zone comprising a lot of voids. In such cases, the speed at which pressure or soundwaves travel through a successfully treated and an incomplete treated zone may also be different. Thus, their associated frequency signatures may also be different. In some embodiments, screenout prediction may be based on comparing recorded frequency signatures with known frequency signatures for successful and/or incomplete screenout situations.

In some circumstances, the model 1914 may be trained to recognize frequency signatures that have a higher likelihood of being associated with cracks large enough to be propped (e.g., crack 1950-*b*), and thus more likely to enhance oil production. In some cases, a crack large enough to be propped may be associated with a higher frac score, than a crack that is too small or narrow to be propped. Additionally or alternatively, the model 1914 may be trained to recognize frequency signatures that have a higher likelihood of being generated by cracks that are too small to be propped (i.e., cracks that insignificantly contribute to oil production), such as crack 1950-*a*. In some circumstances, a crack may generate a different frequency signature when fluid passes through the crack, which may also be used, by the model, to quantify cracks (e.g., assigning a frac score). In one example, quantifying a crack may be based in part on a quality of fluid flow in the crack. In some instances, the quality of fluid flow in the crack may also be used to predict backup of fluid in the wellbore. Additionally or alternatively, backup in the wellbore may be identified based on analyzing pressure conditions in wellbore as well as acoustic data. In one example, high pressure within the wellbore (i.e., above typical conditions) may indicate backup of fluid within the wellbore, which may be attributed to cracks that are too small to be propped.

In some other cases, connection to (or intersection with) the well 1902 may be associated with a unique frequency signature. For instance, the non-well-intersecting cracks 1950-*c* may be linked to lower amplitude frequency spikes than cracks (e.g., cracks 1950-*a* and/or 1950-*b*) that intersect the well 1902, even if those spikes occur at the same frequencies in both cases. As another example, harmonic frequencies may be observed with the cracks 1950-*a* and/or 1950-*b* that intersect the well 1902, in contrast to non-well-intersecting cracks, such as cracks 1950-*c* that do not intersect the well 1902.

In some aspects, the machine learning system 1912 may use any new insights gained from trying to match the frequency domain data to known frequency signatures to further train the model 1914. In some instances, training the model 1914 may also involve taking into account the recorded results data. For instance, the machine learning system 1912 may determine that a frequency signature of an event is similar or substantially similar to known large crack signatures. However, results data, such as poor subsequent oil flow, may suggest that the frequency signature is not actually a good match for a large crack. In such cases, the model 1914 may take this false positive identification into account when trying to match future signatures. Alternatively, results data showing a high oil flow after a non-classified crack signature may help the model 1914 recognize alternative frequency signatures, or even time signatures, for a given classification of crack formation.

After (or in parallel to) training the model 1914, the machine learning system 1912 may utilize the frac score module 1924 to assign a score to an individual crack, to a set of cracks, or to all cracks during a period of time. In some embodiments, the frac score module 1924 may be configured to access frac scores from the frac score database 1922. In some cases, different frac scores may be assigned to different fracking operation parameters (e.g., size of crack, crack intersection with well, high or low liquid flow, horizontal shifting, to name a few non-limiting examples). In some examples, for instance, where frac scores are assigned to individual cracks or sets of cracks, the frac scores may be summed over a time period, such as the duration of a stage, to provide a user friendly assessment of the fracking operation. In one example, the frac score assignment described above may allow an operator to compare a frac score for a 30-minute fracking operation at a first water pressure with respect to a frac score for a second 30-minute fracking operation at a second water pressure. In another example, the frac score assignment may allow an operator to compare two stages of a fracking operation, where one stage utilizes a higher pH than the second stage. As previously noted, a higher frac score may correspond to enhanced oil production (or a higher likelihood of the same) as compared to a lower frac score.

In some embodiments, the frac score may be passed to an operator's computer and display 1916 to enable the operator to make manual adjustments to well operations via the controller 1918. Additionally or alternatively, the machine learning system 1912 may be configured to automatically adjust fracking operations through the controller 1918. Regardless of manual or automated control, the controller 1918 may be instructed to utilize different pressures on different stages, or different stage durations, and adjust pressure or duration for future stages based on frac scores returned from these previous stages. In other words, one or more pressure or duration adjustments may be made for future stages based on settings from previous stages that produced the highest frac scores. In some embodiments, adjusting fracking operations may involve adjusting one or more downhole parameters through the controller 1918 (if automatic control is enabled), or providing one or more suggestions to the operator (if manual control). Some non-limiting examples of downhole parameters may relate to frac stage time, timing of proppant release, controlling perf gun firing (e.g., power), start and end of pumping down perf gun(s), start and end of pumping down plugs, pressurizing frack fluid to initiate creation of fractures, perf gun pressure level, pH of fluids forced into the formation, and well spacing, etc. Furthermore, although frac scores may be assigned based on data from an observation well (i.e., the sensor is coupled to the well that is performing the fracking operation), frac scores may also be assigned based on data from an offset well, or from a combination of the observation well and an offset well.

In addition to being based on high frequency acoustic or vibration data, scores may also be based on data acquired from traditional pressure sensors (e.g., absolute or relative pressure sensors) affixed to the observation well. In some cases, data acquired from a pressure sensor may be used to determine if water is rushing into or out of (i.e., in flow or out flow) a subterranean structure. In another example, a combination of pressure data and acoustic or vibration data may help provide a more accurate understanding of liquid movement (e.g., fast or slow; with or without cavitation; with turbulence or with good laminar flow; backup of fluid or liquid within a wellbore, etc.). This additional data may be considered when assigning scores to cracks, groups of cracks, or all cracks formed during a period of time. For instance, a first crack connected to the well and large enough to be propped may be assigned a score of 9 out of 20. Furthermore, a second crack connected to the well and large enough to be propped, but additionally associated with a water pressure change exceeding a threshold (i.e., as seen by a traditional pressure sensor) may be assigned 6 bonus points, for a total score of 15 out of 20. Similarly, a third crack connected to the well and large enough to be propped, but with a water pressure change under the threshold may only receive a score of 9. Additionally or alternatively, in some embodiments, the acoustic or vibration sensor alone may be used to track both dynamic and static pressure changes. In some examples, the data from the sensor may be analyzed in one or more of the time domain and the frequency domain.

Figure 20A:
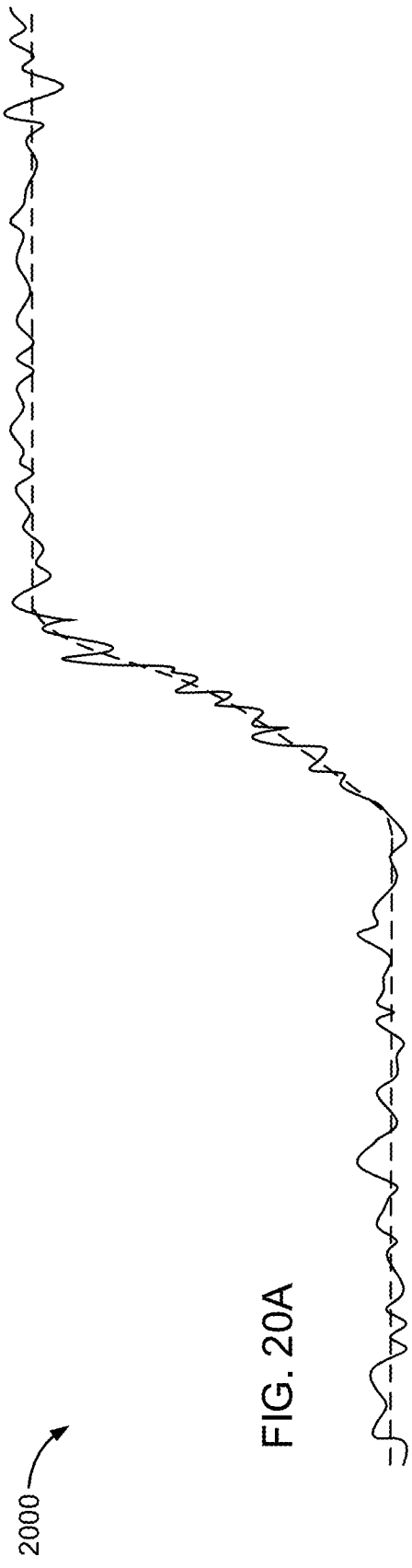
FIG. 20 illustrates a time-domain plot of acoustic or vibration data from an acoustic or vibration sensor in accordance with one or more implementations.
Figure 20B:
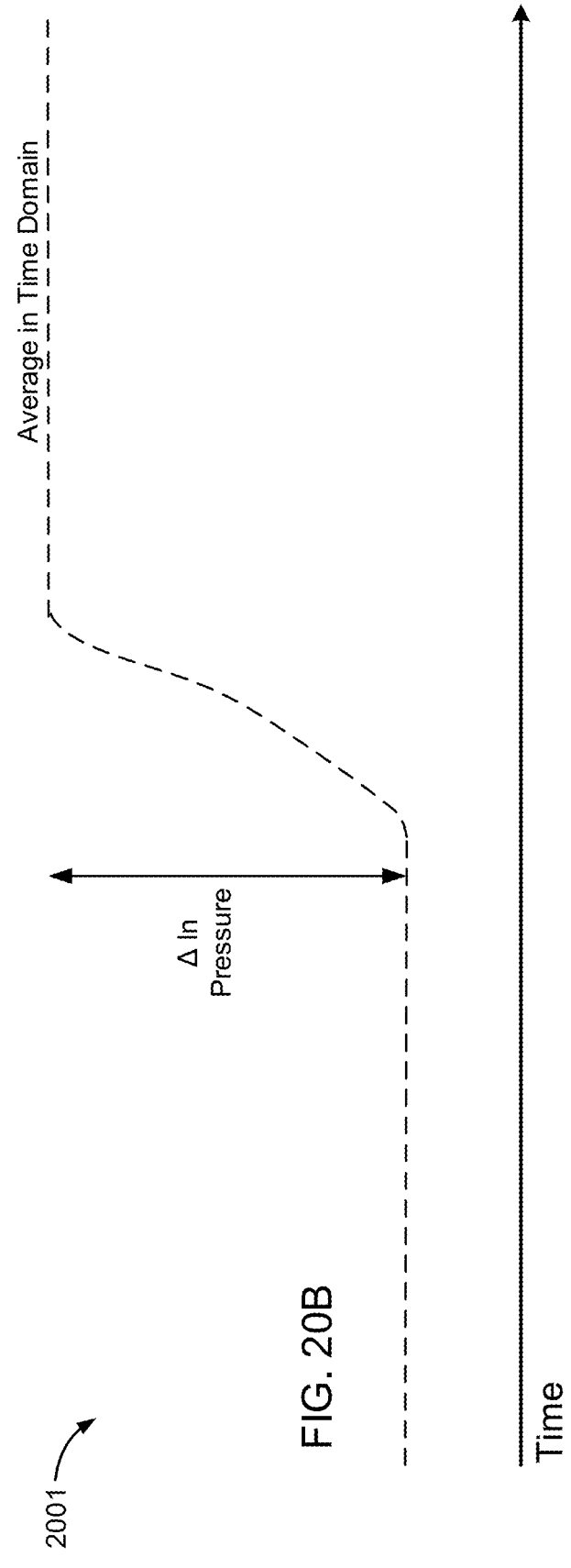

FIGS. 20A and 20B depict plots 2000 and 2001, respectively, of acoustic or vibration data from a single acoustic or vibration sensor as a function of time. As discussed above, in some examples, raw time domain data acquired from an acoustic or vibration sensor may be transformed into the frequency domain in some cases, the frequency components in the converted plot may be compared to known frequency signatures (i.e., frequency signatures of known or previously identified events). Additionally or alternatively, a static pressure change observed in the time domain may also be used, in some embodiments. For instance, as seen in FIG. 20B, an average pressure value in the time domain (see e.g., the dashed line) may be noted. Further, regardless of if an absolute pressure is known, a change in the average pressure value may be recorded as a change in fluid pressure. In this way, a single acoustic or vibration sensor may be deployed to assess fracking operations in both the frequency domain and the time domain (though absolute pressure may not be known).

In some circumstances, a frequency signature can change over time. In some embodiments, the model may be trained to recognize not only static frequency signatures, but also frequency signature changes over time, where the change or a combination of the frequency signature and its change, may be associated with certain events. For example, a single frequency spike may split into two frequency spikes over a consistent period of time (e.g., 10-30 minutes) when a crack is propped similarly, a single frequency spike may split into two frequency spikes, but over a much shorter period of time (e.g., 30-60 seconds), for instance, when a horizontal shift occurs. While these two phenomenon may be confused, for instance, by merely focusing on the frequencies alone, they may be distinguished by looking at the frequency signatures as well as changes in those signatures with time (i.e., due to significant differences in their splitting period).

In yet another embodiment, the model may look at acoustic or vibration data in both the time domain and the frequency domain. For instance, a signature associated with a known event or classification may include, not only a given frequency spike, but also a certain amplitude and amplitude variation in the time domain.

Additional Embodiments

In some examples of the method, system, computing platform, and non-transient computer-readable storage medium described herein, the acoustic vibrations are caused by: injecting the fluid through perforations in a casing under pressure in order to form one or more of subsurface fractures, the fluid's flow through the subsurface fractures, and/or expansion of the subsurface fractures.

In some examples of the method, system, computing platform, and non-transient computer-readable storage medium described herein the sensor samples at greater than 1 kHz. In some examples of the method, system, and non-transient computer-readable storage medium described herein the sensor is an acoustic sensor.

In some examples of the method, system, computing platform, and non-transient computer-readable storage medium described herein the converter uses a Fast-Fourier transform to convert the electrical signal in a window of time into a current frequency domain spectrum.

In some examples of the method, system, computing platform, and non-transient computer-readable storage medium described herein the machine-learning system considers a number of frequency spikes, a width of the frequency spikes, and an amplitude of the frequency spikes in the current frequency domain spectrum.

In some examples of the method, system, computing platform, and non-transient computer-readable storage medium described herein: the machine-learning system is trained on frequency domain spectra measured during previous hydraulic fracturing operations as a machine-learning input and associated well outcomes as machine-learning outputs.

In some examples of the method, system, computing platform, and non-transient computer-readable storage medium described herein: the well outcomes comprise a well flow rate. In some examples of the method, system, computing platform, and non-transient computer-readable storage medium described herein: the well outcomes comprise a fracture intersection with a wellbore of the well used during the training in some examples of the method, system, computing platform, and non-transient computer-readable storage medium described herein the: well outcomes comprise extension of an existing fracture.

In some examples of the method, system, computing platform, and non-transient computer-readable storage medium described herein: the classifying is based on a grouping of frequency domain spectra measured during previous hydraulic fracturing operations that most closely match the current frequency domain spectra.

In some examples of the method, system, computing platform, and non-transient computer-readable storage medium described herein: the sensor is configured to be in contact with the fluid in the well or with a surface of a circulating fluid line or standpipe at the wellhead.

Some examples of the method, system, computing platform, and non-transient computer-readable storage medium described above may further include processes, features, means, or instructions for analyzing the electrical signal for the window of time in the time domain and using this in addition to the analyzing the current frequency domain spectrum to perform the classifying.

Some examples of the method, system, computing platform, and non-transient computer-readable storage medium described above may further include processes, features, means, or instructions for performing the classifying based also on analysis of pressure sensor data during the window of time.

Some examples of the method, system, computing platform, and non-transient computer-readable storage medium described above may further include processes, features, means, or instructions for classifying the current frequency domain spectrum as associated with geometric parameters of the fracture.

Some examples of the method, system, computing platform, and non-transient computer-readable storage medium described above may further include processes, features, means, or instructions for classifying the current frequency domain spectrum as associated with intersection of the fracture and the well.

Some examples of the method, system, computing platform, and non-transient computer-readable storage medium described above may further include processes, features, means, or instructions for classifying the current frequency domain spectrum as associated with extension of the fracture.

Some examples of the method, system, computing platform, and non-transient computer-readable storage medium described above may further include processes, features, means, or instructions for classifying the current frequency domain spectrum as associated with a fracture size that is likely to support propping.

Some examples of the method, system, computing platform, and non-transient computer-readable storage medium described above may further include processes, features, means, or instructions for classifying the current frequency domain spectrum as associated with successful propping of the fracture.

Some examples of the method, system, computing platform, and non-transient computer-readable storage medium described above may further include processes, features, means, or instructions for classifying the current frequency domain spectrum as associated with extension of the fracture.

Some examples of the method, system, computing platform, and non-transient computer-readable storage medium described above may further include processes, features, means, or instructions for classifying the current frequency domain spectrum as associated with at least a temporary end to the extension of the fracture.

Some examples of the method, system, computing platform, and non-transient computer-readable storage medium described above may further include processes, features, means, or instructions for classifying the current frequency domain spectrum as associated with a fracture size that is likely to support propping.

Some examples of the method, system, computing platform, and non-transient computer-readable storage medium described above may further include processes, features, means, or instructions for classifying the current frequency domain spectrum as associated with successful propping of the fracture.

Some examples of the method, system, computing platform, and non-transient computer-readable storage medium described above may further include processes, features, means, or instructions for classifying the current frequency domain spectrum as associated with (1) intersection of the fracture and the well, (2) intersection of the fracture and the well, but a fracture size that is unlikely to support propping, or (3) no intersection of the fracture and the well.

In some examples of the method, system, computing platform, and non-transient computer-readable storage medium described herein the machine-learning system is trained on frequency domain spectra measured during previous hydraulic fracturing operations as a machine-learning output and associated downhole operations as machine-learning inputs.

Some examples of the method, system, computing platform, and non-transient computer-readable storage medium described above may further include processes, features, means, or instructions for classifying the current frequency domain spectrum as associated with perforation gun firing.

Some examples of the method, system, computing platform, and non-transient computer-readable storage medium described above may further include processes, features, means, or instructions for classifying the current frequency domain spectrum as associated with proppant pumping.

Some examples of the method, system, computing platform, and non-transient computer-readable storage medium described above may further include processes, features, means, or instructions for classifying the current frequency domain spectrum as associated with a start or end of plug transport down the well.

In some examples of the method, system, computing platform, and non-transient computer-readable storage medium described herein the converting is performed on a local converter and the current frequency domain spectrum is transported via a large area network to a remote server hosting the machine-learning system.

In some examples of the method, system, computing platform, and non-transient computer-readable storage medium described herein the electrical signal is transported via a large area network to a remote converter for performing the converting.

In some examples of the method, system, computing platform, and non-transient computer-readable storage medium described herein the converter is a spectrum analyzer. In some examples of the method, system, computing platform, and non-transient computer-readable storage medium described herein the sensor is in direct fluid communication with the fracking fluid. In some examples of the method, system, computing platform, and non-transient computer-readable storage medium described herein the sensor is coupled to an outside of the wellhead, associated piping, or the feedline.

In some embodiments, the system further comprise a wellbore with a casing; and a fracking pump.

In some examples of the method and non-transient computer-readable storage medium described herein the analyzing considers a number of frequency spikes, a width of the frequency spikes, and an amplitude of the frequency spikes in the current frequency domain spectrum.

In some examples of the method and non-transient computer-readable storage medium described herein: the well outcomes comprise a well flow rate. In some examples of the method and non-transient computer-readable storage medium described herein: the well outcomes comprise a fracture intersection with a wellbore of a well used during the training in some examples of the method and non-transient computer-readable storage medium described herein: the well outcomes comprise extension of an existing fracture. In some examples of the method and non-transient computer-readable storage medium described herein: the classifying is based on a grouping of frequency domain spectra measured during previous hydraulic fracturing operations that most closely match the current frequency domain spectra.

In some examples of the method and non-transient computer-readable storage medium described herein: the sensor is configured to be in contact with the fluid in the well or with a surface of a circulating fluid line or standpipe at the wellhead.

In some examples of the method and non-transient computer-readable storage medium described herein the performing the classifying is based at least in part on analyzing the electrical signal for the window of time in the time domain in addition to the analyzing the current frequency domain spectrum. In some examples of the method and non-transient computer-readable storage medium described herein the performing the classifying is based also on analysis of pressure sensor data during the window of time.

In some examples of the method and non-transient computer-readable storage medium described herein, the method further comprises: classifying the current frequency domain spectrum as associated with geometric parameters of the fracture.

In some examples of the method and non-transient computer-readable storage medium described herein, the method further comprises: classifying the current frequency domain spectrum as associated with intersection of the fracture and the well.

In some examples of the method and non-transient computer-readable storage medium described herein, the method further comprises: classifying the current frequency domain spectrum as associated with extension of the fracture.

In some examples of the method and non-transient computer-readable storage medium described herein, the method further comprises: classifying the current frequency domain spectrum as associated with a fracture size that is likely to support propping. In some examples of the method and non-transient computer-readable storage medium described herein, the method further comprises: classifying the current frequency domain spectrum as associated with successful propping of the fracture.

In some examples of the method and non-transient computer-readable storage medium described herein, the method further comprises: classifying the current frequency domain spectrum as associated with extension of the fracture. In some examples of the method and non-transient computer-readable storage medium described herein, the method further comprises: classifying the current frequency domain spectrum as associated with at least a temporary end to the extension of the fracture. In some examples of the method and non-transient computer-readable storage medium described herein, the method further comprises: classifying the current frequency domain spectrum as associated with a fracture size that is likely to support propping.

In some examples of the method and non-transient computer-readable storage medium described herein, the method further comprises: classifying the current frequency domain spectrum as associated with successful propping of the fracture. In some examples of the method and non-transient computer-readable storage medium described herein, the method further comprises: classifying the current frequency domain spectrum as associated with (1) intersection of the fracture and the well, (2) intersection of the fracture and the well, but a fracture size that is unlikely to support propping, or (3) no intersection of the fracture and the well.

In some examples of the method and non-transient computer-readable storage medium described herein, the converting is performed on a local converter and the current frequency domain spectrum is transported via a large area network to a remote server hosting the machine-learning system. In some examples of the method and non-transient computer-readable storage medium described herein the electrical signal is transported via a large area network to a remote converter for performing the converting.

In some examples of the method and non-transient computer-readable storage medium described herein, the method further comprises adjusting parameters of subsequent hydraulic fracturing operations to change how a subsequent frequency domain spectrum is classified.

In some examples of the method and non-transient computer-readable storage medium described herein the second fracking operation is adjusted for perforation gun pressure. In some examples of the method and non-transient computer-readable storage medium described herein the second fracking operation is adjusted for fracking stage duration. In some examples of the method and non-transient computer-readable storage medium described herein the second fracking operation is adjusted for a pressure of fluid forced into the formation during a fracking stage. In some examples of the method and non-transient computer-readable storage medium described herein the second fracking operation is adjusted for a pH of fluid pumped into the well.

In some examples of the method and non-transient computer-readable storage medium described herein the downhole hydraulic fracturing operation comprises a perforation gun firing. In some examples of the method and non-transient computer-readable storage medium described herein the downhole hydraulic fracturing operation comprises a start of plug pumping. In some examples of the method and non-transient computer-readable storage medium described herein the downhole hydraulic fracturing operation comprises an end of plug pumping. In some examples of the method and non-transient computer-readable storage medium described herein the downhole hydraulic fracturing operation comprises proppant pumping. In some examples of the method and non-transient computer-readable storage medium described herein the downhole hydraulic fracturing operation comprises a frac fluid pumping. In some examples of the method and non-transient computer-readable storage medium described herein the downhole hydraulic fracturing operation comprises a start of pressurization of a fracking stage.

Some portions of this disclosure are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system for classifying fracture quantity and quality or fracturing operation activities during hydraulic fracturing operations, the system comprising:
   a sensor coupled to a fracking wellhead, circulating fluid line, or standpipe of a well and configured to convert acoustic vibrations in fracking fluid in the fracking wellhead into an electrical signal;
   a memory configured to store the electrical signal;
   a converter configured to access the electrical signal from the memory and convert the electrical signal in a window of time into a current frequency domain spectrum;
   a machine-learning system configured to classify the current frequency domain spectrum, the machine-learning system having been trained on previous frequency domain spectra measured during previous hydraulic fracturing operations and previously classified by the machine-learning system; and
   a user interface configured to return a classification of the current frequency domain spectrum to an operator of the fracking wellhead.

2. The system of claim 1, wherein the acoustic vibrations are caused by: injecting the fluid through perforations in a casing under pressure in order to form subsurface fractures, the fluid's flow through the subsurface fractures, or expansion of the subsurface fractures.

3. The system of claim 1, wherein the sensor samples at greater than 1 kHz or is an acoustic sensor.

4. The system of claim 1, wherein the machine-learning system considers a number of frequency spikes, a width of the frequency spikes, and an amplitude of the frequency spikes in the current frequency domain spectrum.

5. The system of claim 1, wherein the machine-learning system is trained on frequency domain spectra measured during previous hydraulic fracturing operations as a machine-learning input and associated well outcomes as machine-learning outputs.

6. The system of claim 5, wherein the well outcomes comprise a well flow rate, a fracture intersection with a wellbore of the well used during the training, or extension of an existing fracture.

7. The system of claim 1, wherein the classifying is based on a grouping of frequency domain spectra measured during previous hydraulic fracturing operations that most closely match the current frequency domain spectra.

8. The system of claim 1, wherein the sensor is configured to be in contact with the fluid in the well or with a surface of a circulating fluid line or standpipe at the wellhead.

9. The system of claim 1, further comprising analyzing the electrical signal for the window of time in the time domain and using this in addition to the analyzing the current frequency domain spectrum to perform the classifying.

10. The system of claim 1, further comprising performing the classifying based also on analysis of pressure sensor data during the window of time.

11. The system of claim 1, further comprising classifying the current frequency domain spectrum as associated with geometric parameters of a fracture, or as associated with intersection of the fracture and the well.

12. The system of claim 11, further comprising classifying the current frequency domain spectrum as associated with intersection of the fracture and the well.

13. The system of claim 12, further comprising classifying the current frequency domain spectrum as associated with extension of the fracture.

14. The system of claim 13, further comprising classifying the current frequency domain spectrum as associated with a fracture size that is likely to support propping, or as associated with successful propping of the fracture.

15. The system of claim 1, further comprising classifying the current frequency domain spectrum as associated with extension of a fracture, as associated with at least a temporary end to the extension of the fracture, as associated with a fracture size that is likely to support propping, or as associated with successful propping of the fracture.

16. The system of claim 1, further comprising classifying the current frequency domain spectrum as associated with (1) intersection of a fracture and the well, (2) intersection of the fracture and the well, but a fracture size that is unlikely to support propping, or (3) no intersection of the fracture and the well.

17. The system of claim 1, wherein the machine-learning system is trained on frequency domain spectra measured during previous hydraulic fracturing operations as a machine-learning output and associated downhole operations as machine-learning inputs.

18. The system of claim 1, further comprising classifying the current frequency domain spectrum as associated with perforation gun firing, as associated with proppant pumping, or as associated with a start or end of plug transport down the well.

19. The system of claim 1, wherein the converter is a spectrum analyzer.

20. The system of claim 1, wherein the sensor is in direct fluid communication with the fracking fluid.

21. The system of claim 1, wherein the sensor is coupled to an outside of the wellhead, associated piping, or the feedline.

22. The system of claim 1, further comprising:
a wellbore with a casing; and
a fracking pump.

23. A method of classifying fracture quantity and quality during hydraulic fracturing operations, the method comprising:
providing a sensor coupled to a wellhead, circulating fluid line, or standpipe of a well and configured to convert acoustic vibrations in fluid in the well into an electrical signal in a time domain;
recording the electrical signal to a memory;
converting the electrical signal for a window of time to a current frequency domain spectrum comprising one or more amplitude spikes, the current frequency domain spectrum constituting a measured frequency signature;
analyzing the current frequency domain spectrum via a machine-learning system trained on previous frequency domain spectra measured during previous hydraulic fracturing operations and previously classified by the machine-learning system; and
classifying the current frequency domain spectrum as associated with initiation of a fracture in the well; and
returning a classification of the current frequency domain spectrum to a well operator.

24. The method of claim 23, wherein the sensor samples at greater than 1 kHz or is an acoustic sensor.

25. The method of claim 23, wherein the analyzing considers a number of frequency spikes, a width of the frequency spikes, and an amplitude of the frequency spikes in the current frequency domain spectrum.

26. The method of claim 23, wherein the machine-learning system is trained on frequency domain spectra measured during previous hydraulic fracturing operations as a machine-learning input and associated well outcomes as machine-learning outputs.

27. The method of claim 26, wherein the well outcomes comprise a well flow rate, a fracture intersection with a wellbore of a well used during the training, or extension of an existing fracture.

28. The method of claim 23, wherein the classifying is based on a grouping of frequency domain spectra measured during previous hydraulic fracturing operations that most closely match the current frequency domain spectra.

29. The method of claim 23, wherein the sensor is configured to be in contact with the fluid in the well or with a surface of a circulating fluid line or standpipe at the wellhead.

30. The method of claim 23, further comprising analyzing the electrical signal for the window of time in the time domain and using this in addition to the analyzing the current frequency domain spectrum to perform the classifying.

31. The method of claim 23, further comprising performing the classifying based also on analysis of pressure sensor data during the window of time.

32. The method of claim 23, further comprising classifying the Current frequency domain spectrum as associated with geometric parameters of the fracture.

33. The method of claim 23, further comprising classifying the Current frequency domain spectrum as associated with intersection of the fracture and the well.

34. The method of claim 33, further comprising classifying the Current frequency domain spectrum as associated with extension of the fracture.

35. The method of claim 34, further comprising classifying the current frequency domain spectrum as associated with a fracture size that is likely to support propping, or as associated with successful propping of the fracture.

36. The method of claim 23, further comprising classifying the current frequency domain spectrum as associated with extension of the fracture, as associated with at least a temporary end to the extension of the fracture.

37. The method of claim 23, further comprising classifying the current frequency domain spectrum as associated with a fracture size that is likely to support propping or as associated with successful propping of the fracture.

38. The method of claim 23, further comprising classifying the current frequency domain spectrum as associated with (1) intersection of the fracture and the well, (2) intersection of the fracture and the well, but a fracture size that is unlikely to support propping, or (3) no intersection of the fracture and the well.

39. The method of claim 23, further comprising adjusting parameters of subsequent hydraulic fracturing operations to change how a subsequent frequency domain spectrum is classified.

40. A method of identifying downhole hydraulic fracturing operations in real time, the method comprising:
providing a sensor coupled to a wellhead, circulating fluid line, or standpipe of a well and configured to convert acoustic vibrations in fluid in the well into an electrical signal in a time domain;
recording the electrical signal to a memory;
converting the electrical signal for a window of time to a current frequency domain spectrum comprising one or more amplitude spikes, the current frequency domain spectrum constituting a measured frequency signature;
analyzing the current frequency domain spectrum via a machine learning system trained on previous frequency domain spectra measured during previous hydraulic fracturing operations and previously classified by the machine-learning system;
classifying the current frequency domain spectrum as associated with a downhole hydraulic fracturing operation; and
returning a classification of the current frequency domain spectrum to a well operator.

41. The method of claim 40, wherein the downhole hydraulic fracturing operation is a perforation gun firing, a start of plug pumping, an end of plug pumping, proppant pumping, frac fluid pumping, or a start of pressurization of a fracking stage.

42. The method of claim 40, further comprising adjusting parameters of subsequent hydraulic fracturing operations to change how a subsequent frequency domain spectrum is classified.

43. The method of claim 40, wherein the sensor samples at greater than 1 kHz or is an acoustic sensor.

44. The method of claim 40, wherein the analyzing considers a number of frequency spikes, a width of the frequency spikes, and an amplitude of the frequency spikes in the current frequency domain spectrum.

45. A method of training a machine-learning model for hydraulic fracturing operations, the method comprising:
providing a sensor coupled to a wellhead, circulating fluid line, or standpipe of a well and configured to convert acoustic vibrations in fluid in the well into an electrical signal in a time domain;

recording the electrical signal to a memory;
converting the electrical signal for a window of time to a current frequency domain spectrum comprising one or more amplitude spikes, the current frequency domain spectrum constituting a measured frequency signature;
analyzing the current frequency domain spectrum via a machine learning system trained on previous frequency domain spectra measured during previous hydraulic fracturing operations and previously classified by the machine learning system;
classifying the current frequency domain spectrum as associated with subterranean drilling or fracking activity; and
wherein the machine-learning system is trained by grouping the current frequency domain spectrum with similar ones of the previous frequency domain spectra that are also associated with the subterranean drilling or fracking activity, and classifying each grouping.

* * * * *